US010005333B2

(12) United States Patent
Leonard et al.

(10) Patent No.: US 10,005,333 B2
(45) Date of Patent: Jun. 26, 2018

(54) END MEMBER ASSEMBLIES AND TRAVEL-RESTRAINT ASSEMBLIES AS WELL AS GAS SPRING ASSEMBLIES INCLUDING SAME

(71) Applicant: Firestone Industrial Products Company, LLC, Indianapolis, IN (US)

(72) Inventors: Joshua R. Leonard, Noblesville, IN (US); Graham R. Brookes, Noblesville, IN (US); Pradipta N. Moulik, Carmel, IN (US); Stephen C. Street, Carmel, IN (US); Corey S. Hart, McCordsville, IN (US); Daniel P. Steele, Brownsburg, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 99 days.

(21) Appl. No.: 14/894,053

(22) PCT Filed: May 28, 2014

(86) PCT No.: PCT/US2014/039868
§ 371 (c)(1),
(2) Date: Nov. 25, 2015

(87) PCT Pub. No.: WO2014/194008
PCT Pub. Date: Dec. 4, 2014

(65) Prior Publication Data
US 2016/0121682 A1     May 5, 2016

Related U.S. Application Data

(60) Provisional application No. 61/828,096, filed on May 28, 2013.

(51) Int. Cl.
*B60G 11/27* (2006.01)
*B60G 15/12* (2006.01)
(Continued)

(52) U.S. Cl.
CPC .............. *B60G 11/27* (2013.01); *B60G 15/12* (2013.01); *F16F 9/04* (2013.01); *F16F 9/049* (2013.01);
(Continued)

(58) Field of Classification Search
CPC .. B60G 11/27; B60G 15/12; B60G 2202/152; B60G 2500/2014; F16F 9/0472; F16F 9/04; F16F 9/05
See application file for complete search history.

(56) References Cited

U.S. PATENT DOCUMENTS 3,343,831 A   9/1967  Cripe
4,786,035 A   11/1988 Elliott
(Continued)

FOREIGN PATENT DOCUMENTS

DE   10 2011 054330     4/2013

OTHER PUBLICATIONS

International Search Report and Written Opinion for corresponding patent application No. PCT/US2014/039868 dated Sep. 19, 2014.

*Primary Examiner* — Barry Gooden, Jr.
(74) *Attorney, Agent, or Firm* — Brian D. McAlhaney; Fay Sharpe LLP

(57) ABSTRACT

An end member assembly (EMI) includes an end member body (400) and a support column (500). The end member body (400) includes an outer side wall and an inner side wall that together at least partially define an end member reservoir. The inner side wall at least partially defines a passage through the end member body. The support column (500) extends into the passage and is accessible from along opposing ends of the passage. A sealing element can be disposed in fluid communication between the end member body and the support column. An elongated gas damping passage can extend through the end member assembly in (Continued)

fluid communication with the end member reservoir. A gas spring assembly can include a flexible spring member (200) that at least partially defines a spring chamber with an end member (900) and the end member assembly (EMI) on opposing ends thereof. A restraining assembly (1000) can be secured within the spring chamber.

20 Claims, 17 Drawing Sheets

(51) Int. Cl.
    *F16F 9/04*           (2006.01)
    *F16F 9/05*           (2006.01)
    *F16F 13/00*         (2006.01)

(52) U.S. Cl.
    CPC .............. *F16F 9/0472* (2013.01); *F16F 9/05* (2013.01); *F16F 9/052* (2013.01); *F16F 9/057* (2013.01); *F16F 13/002* (2013.01); *B60G 2202/152* (2013.01); *B60G 2500/2014* (2013.01)

(56) References Cited

U.S. PATENT DOCUMENTS

| | | | | |
|---|---|---|---|---|
| 6,024,343 | A * | 2/2000 | Ebert | B60G 11/28 267/124 |
| 9,254,727 | B2 * | 2/2016 | Moulik | B60G 17/0521 |
| 9,259,985 | B2 * | 2/2016 | Leonard | B60G 11/27 |
| 9,555,684 | B2 * | 1/2017 | Street | B60G 11/27 |
| 9,630,469 | B2 * | 4/2017 | Leonard | B60G 15/00 |
| 2001/0024004 | A1 * | 9/2001 | Pradel | B60G 17/044 267/64.27 |
| 2003/0015830 | A1 * | 1/2003 | Miller | B60G 15/08 267/140.11 |
| 2006/0226586 | A1 * | 10/2006 | Levy | B60G 11/28 267/64.27 |
| 2008/0246198 | A1 * | 10/2008 | Levy | B60G 11/28 267/124 |
| 2010/0252970 | A1 * | 10/2010 | Leonard | B60G 11/28 267/64.21 |
| 2011/0115139 | A1 * | 5/2011 | Moulik | B60G 15/14 267/64.23 |
| 2011/0115140 | A1 * | 5/2011 | Moulik | B60G 15/14 267/64.23 |
| 2012/0061887 | A1 * | 3/2012 | Westnedge | B60G 11/27 267/64.24 |
| 2012/0086178 | A1 * | 4/2012 | Brookes | B60G 17/0155 280/6.157 |
| 2012/0200057 | A1 * | 8/2012 | Juriga | B60G 9/00 280/124.116 |
| 2012/0313304 | A1 * | 12/2012 | Street | B60G 11/27 267/122 |
| 2013/0093132 | A1 * | 4/2013 | Street | B60G 11/27 267/122 |
| 2013/0207329 | A1 * | 8/2013 | Leonard | B60G 11/62 267/220 |
| 2014/0091505 | A1 * | 4/2014 | Brookes | G01S 7/521 267/64.19 |
| 2014/0091548 | A1 * | 4/2014 | Ratz | B60G 11/27 280/124.157 |
| 2014/0167337 | A1 * | 6/2014 | Ramsey | F16F 9/057 267/124 |
| 2015/0008627 | A1 * | 1/2015 | Leonard | F16F 7/09 267/64.24 |
| 2015/0130146 | A1 * | 5/2015 | Moulik | B60G 17/0521 280/6.157 |
| 2016/0016450 | A1 * | 1/2016 | Yamamoto | B60G 9/003 267/64.27 |
| 2016/0236532 | A1 * | 8/2016 | Moulik | F16F 9/05 |

\* cited by examiner

END MEMBER ASSEMBLIES AND TRAVEL-RESTRAINT ASSEMBLIES AS WELL AS GAS SPRING ASSEMBLIES INCLUDING SAME

BACKGROUND

The present disclosure broadly relates to the art of gas spring devices and, more particularly, to end member assemblies and travel-restraint assemblies dimensioned for operative connection to the end member assemblies for use in forming gas spring assemblies. Gas spring assemblies including such end member and/or travel-restraint assemblies as well as suspension systems that includes one or more of such gas spring assemblies are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In some cases, it has been deemed desirable to reduce the overall weight of motor vehicles, such as to improve fuel efficiency and/or to increase the transportable payload for the same gross weight vehicle. Reducing the weight of one or more components of the pressurized gas system of vehicles can be one contributing factor to achieving such a goal. In many cases, conventional end members have been designed and constructed from metal materials to provide desired performance characteristics, such as strength, rigidity, and robustness of connection with the associated components and/or structures. Reducing the size of such components or changing the material from which the components are formed can be useful in contributing to the reduced weight of a vehicle suspension system, such as has been described above. However, it has been recognized that such alterations to known constructions can result in corresponding reductions in performance.

Additionally, vehicle suspension systems of a wide variety of types and kinds have been developed and are commonly used. Components of such vehicle suspension systems are often secured between opposing structural members that move relative to one another during travel between jounce and rebound conditions. In many applications and uses associated with wheeled motor vehicles, the suspension system of the vehicle is adapted and arranged such that there are substantially no operating conditions, during normal usage, under which the plurality of spring devices would be tensioned or otherwise undergo a tension load. That is, the configuration and/or use of conventional suspension systems is such that the spring devices are not tensioned under during rebound motion and are generally used in compression under normal operating conditions.

In other cases, however, the suspension system of vehicles can be configured in a manner that will allow the spring devices to experience conditions under which the spring devices are extended beyond a typical or normal condition of use. Such over-extended conditions are generally deemed to be undesirable. As such, a variety of arrangements have been proposed to prevent the occurrence of such conditions or to at least reduce the effect that such an event has on the structure and performance of the spring devices. However, known travel-restraint devices can undesirably increase the weight associated with the suspension system of a vehicle.

Notwithstanding the common use and overall success of known gas spring constructions, it is believed desirable to develop constructions for gas spring assemblies and/or components thereof that are capable of providing improved performance or other characteristics and/or overcoming disadvantages of known constructions while promoting relatively low costs of manufacture, ease of assembly and/or otherwise advancing the art of gas spring devices.

BRIEF SUMMARY

One example of a gas spring assembly in accordance with the subject matter of the present disclosure can include a flexible spring member having a longitudinal axis. The flexible spring member can include a flexible wall that can extend peripherally about the axis and can extend longitudinally between a first end and a second end opposite the first end. An end member can be operatively connected to the flexible wall across the first end thereof such that a substantially fluid-tight seal is formed between the end member and the flexible spring member. An end member assembly can be operatively connected to the flexible wall across the second end thereof such that a substantially fluid-tight seal is formed between the end member assembly and the flexible spring member. The end member assembly can include an end member body and a support column. The end member body can include an outer side wall, an end wall disposed opposite the flexible spring member, and an inner side wall that at least partially defines a passage extending through the end member body and can be accessible from along the end wall. The support column can include a base wall extending transverse to the longitudinal axis and a column wall projecting axially from the base wall. The support column can be oriented such that the base wall is disposed along the end wall of the end member body and the column wall projects into the passage of the end member body. A jounce bumper can be disposed along the end member body and can be operatively secured to the column wall of the support column.

Another example of a gas spring assembly in accordance with the subject matter of the present disclosure can include a flexible spring member having a longitudinal axis. The flexible spring member can include a flexible wall that can extend peripherally about the axis and can extend longitudinally between a first end and a second end opposite the first end. The flexible wall can have a first wall portion disposed toward the first end, a second wall portion disposed toward the second end and an intermediate wall portion disposed between the first and second wall portions. The first, second and intermediate wall portions can each have a flexural stiffness with the flexural stiffness of the intermediate portion being substantially greater than at least one of the first and second wall portions. An end member can be operatively connected to the flexible wall across the first end thereof such that a substantially fluid-tight seal is formed between the end member and the flexible spring member. An end member assembly can be operatively connected to the flexible wall across the second end thereof such that a substantially fluid-tight seal is formed between the end member assembly and the flexible spring member. The end member assembly can include an end member body and a support column. The end member body can include an outer side wall, an end wall disposed opposite the flexible spring member, and an inner side wall. The outer side wall can include a first outer side wall portion having a first cross-section dimension and a second outer side wall portion having a second cross-sectional dimension that is greater than the first cross-sectional dimension such that a transition wall portion is disposed between the first and second outer side wall portions. The end wall can be disposed opposite the flexible spring member, and the inner side wall can at least partially define a passage extending through the end member body and that is accessible from along the end wall. The support column can include a base wall extending transverse to the longitudinal axis and a column wall projecting axially from the base wall. The support column can be oriented such that the base wall is disposed along the end wall of the end member body and the column wall projects into the passage of the end member body. The flexible wall can form a rolling lobe along the outer side wall of the end member body of the end member assembly with the intermediate wall portion of the flexible wall disposed along the transition wall portion of the outer side wall of the end member body at a predetermined height of the gas spring assembly.

A further example of a gas spring assembly in accordance with the subject matter of the present disclosure can include a flexible spring member having a longitudinal axis. The flexible spring member can include a flexible wall that can extend peripherally about the axis and can extend longitudinally between a first end and a second end opposite the first end. An end member can be operatively connected to the flexible wall across the first end thereof such that a substantially fluid-tight seal is formed between the end member and the flexible spring member. An end member assembly can be operatively connected to the flexible wall across the second end thereof such that a substantially fluid-tight seal is formed between the end member assembly and the flexible spring member. The end member assembly can include an end member body and a support column. The end member body can include an outer side wall, an end wall disposed opposite the flexible spring member, and an inner side wall that at least partially defines a passage extending through the end member body and can be accessible from along the end wall. The support column can include a base wall extending transverse to the longitudinal axis and a column wall projecting axially from the base wall. The support column can be oriented such that the base wall is disposed along the end wall of the end member body and the column wall projects into the passage of the end member body. A restraint assembly can be disposed within the spring chamber and can be operatively connected between the end member and support column of the end member assembly such that upon extension of the gas spring assembly in a longitudinal direction the restraint assembly can generate a tensile force acting between the end member and the end member assembly.

A gas spring assembly according to the foregoing paragraph can also include an over-extension device operatively connected between the restraint assembly and at least one of the end member and the end member assembly. In some cases, the over-extension device can be included on or along the end member assembly, and can include a connector rod and a biasing element.

One example of a gas spring and gas damper assembly in accordance with the subject matter of the present disclosure can include a gas spring assembly according to any one of the foregoing paragraphs with the gas spring assembly including a spring chamber having a pressurized gas volume that can vary during certain conditions of use. Such a gas spring and gas damper assembly can also include at least one additional pressurized gas reservoir that is internal to the gas spring and gas damper assembly but separate or otherwise fluidically dissociated from the spring chamber. The additional pressurized gas reservoir can have a pressurized gas volume that is substantially fixed in comparison with the pressurized gas volume of the spring chamber. A gas spring and gas damper assembly in accordance with the subject matter of the present disclosure can also include an elongated gas damping passage in fluid communication between the spring chamber and the additional pressurized gas reservoir. In some cases, the elongated gas damping passage can be tuned or otherwise operative to generate pressurized gas damping of vibrations across a targeted frequency or range of frequencies.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
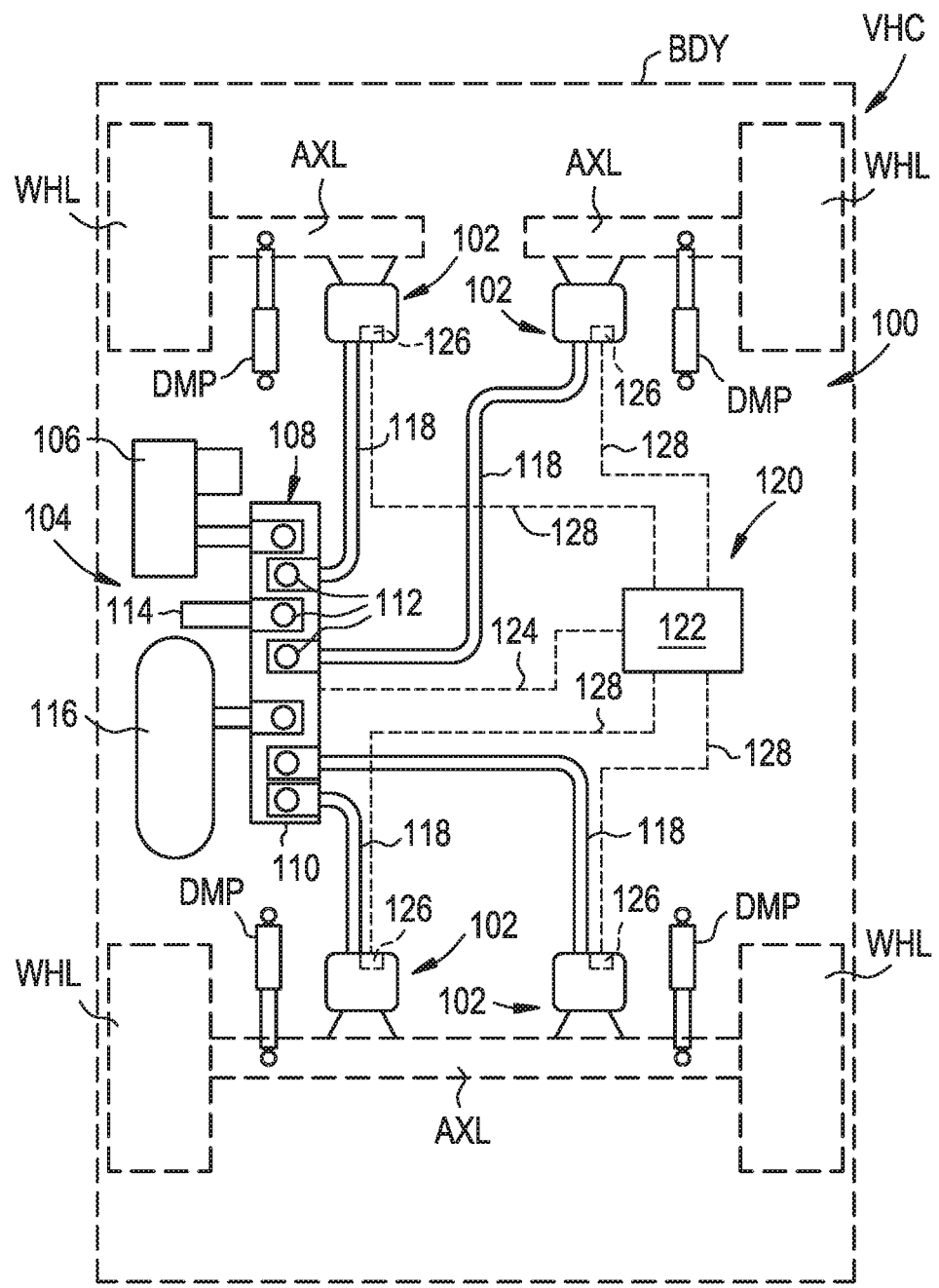
FIG. 1 is a schematic representation of one example of a suspension system that includes a plurality of gas spring assemblies and/or gas spring and gas damper assemblies in accordance with the subject matter of the present disclosure.
Figure 2:
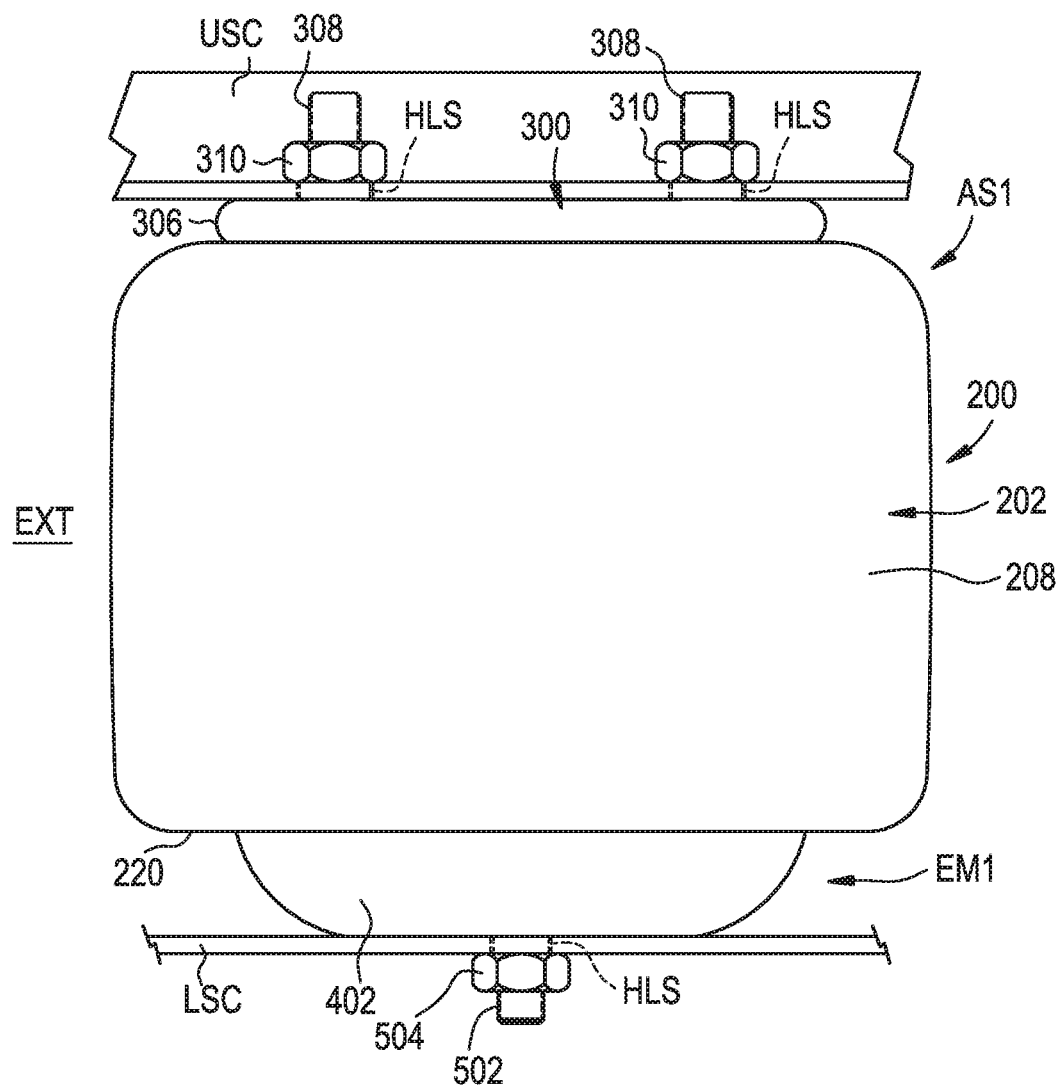
FIG. 2 is a side elevation view of one example of a gas spring assembly including an end member assembly accordance with the subject matter of the present disclosure.
Figure 3:
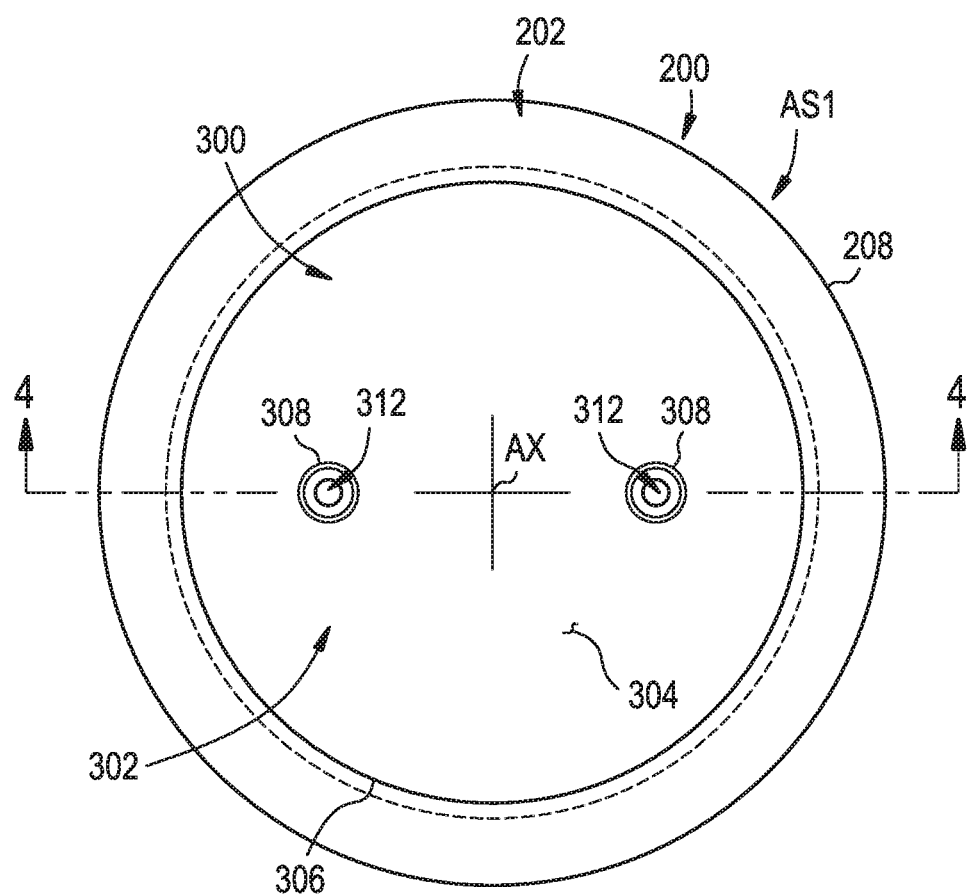
FIG. 3 is a top plan view of the gas spring assembly shown in FIG. 2.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

The suspension system can also include a plurality of assemblies supported between the sprung and unsprung masses of the associated vehicle. In the arrangement shown in FIG. 1, suspension system 100 includes four assemblies 102, one of which is disposed toward each corner of the associated vehicle adjacent a corresponding wheel WHL. However, it will be appreciated that any other suitable number of assemblies could alternately be used in any other configuration or arrangement. As shown in FIG. 1, assemblies 102 are supported between axles AXL and body BDY of associated vehicle VHC.

In some cases, the plurality of assemblies can take the form of gas spring assemblies that utilize pressurized gas to at least partially support the sprung mass on the unsprung mass. In other cases, the plurality of assemblies can take the form of gas spring and gas damper assemblies that utilize pressurized gas as the working medium to at least partially support the sprung mass on the unsprung mass as well as to dissipate kinetic energy acting on the vehicle or otherwise communicated to the assemblies. Typically, such gas spring and gas damper assemblies permit gas flow between two or more volumes of pressurized gas through one or more orifices or through one or more valve ports. The resistance to the movement of pressurized gas through these passages or ports generates pressurized gas damping.

It will be recognized that in the arrangement shown in FIG. 1, assemblies 102 are illustrated as including a gas spring having a rolling lobe-type construction. It is to be understood, however, that gas springs of other types, kinds and/or constructions could alternately be used. Additionally, depending on desired performance characteristics and/or other factors, the suspension system may, in some cases, also include damping members, such as dampers DMP, for example, of a typical construction that are provided separately from assemblies 102 and secured between the sprung and unsprung masses in a conventional manner. However, in cases in which assemblies 102 include pressurized gas damping, such as has been described above, it may be preferred for such constructions to be sized, configured and operative to provide the desired performance characteristics for the suspension system without the use of additional damping members (e.g., conventional struts or shock absorbers) that are separately provided.

Suspension system 100 also includes a pressurized gas system 104 operatively associated with the assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 can be in fluid communication with assemblies 102 in any suitable manner, such as through suitable gas transfer lines 118, for example. As such, pressurized gas can be selectively transferred into and/or out of the assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from assemblies 102. Controller 122 can be of any suitable type, kind and/or configuration.

Control system 120 can also, optionally, include one or more height (or distance) sensing devices 126, such as, for example, may be operatively associated with the assemblies and capable of outputting or otherwise generating data, signals and/or other communications having a relation to a height of the assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction.

One example of an assembly AS1 in accordance with the subject matter of the present disclosure, such as may be suitable for use as one of assemblies 102 in FIG. 1, for example, is shown in FIGS. 2-5. Assembly AS1 can have a longitudinal axis AX and can include a flexible spring member 200 as well as an end member 300 and an end member assembly EM1 that are operatively connected to the flexible spring member.

It will be appreciated that flexible spring member 200 can be of any suitable size, shape, construction and/or configuration. Additionally, the flexible spring member can be of any type and/or kind, such as a rolling lobe-type or convoluted bellows-type construction, for example. Flexible spring member 200 is shown in FIGS. 2-5 as including a flexible wall 202 that can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 202 can extend in a generally longitudinal direction between opposing ends 204 and 206. Additionally, flexible wall 202 can include an outer surface 208 and an inner surface 210, which can at least partially define a spring chamber 212. Flexible wall 202 can include an outer or cover ply (not identified) that at least partially forms outer surface 208. Flexible wall 202 can also include an inner or liner ply (not identified) that at least partially forms inner surface 210. In some cases, flexible wall 202 can further include one or more reinforcing plies (not shown) disposed between outer and inner surfaces 208 and 210. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an approximately equal but opposite bias angle.

Flexible spring member 200 can include any feature or combination of features suitable for forming a substantially fluid-tight connection with end member 300 and/or end member assembly EM1. As one example, flexible wall 202 can include a mounting bead 214 disposed along end 204 and a mounting bead 216 disposed along end 206. In such cases, the mounting bead, if provided, can, optionally, include a reinforcing element, such as an endless, annular bead wire 218, for example.

It will be appreciated that the end members and/or end member assemblies can be of any suitable type, kind, construction and/or configuration, and can be operatively connected or otherwise secured to the flexible spring member in any suitable manner. In the exemplary arrangement shown in FIGS. 2-4, for example, end member 300 is of a type commonly referred to as a bead plate and includes an end member wall 302 with a central wall portion 304 and an outer peripheral wall portion 306. End member 300 is disposed along end 204 of flexible wall 202 with outer peripheral wall portion 306 crimped or otherwise deformed around at least a portion of mounting bead 214 such that a substantially fluid-tight seal can be formed between flexible spring member 200 and end member 300.

Gas spring assembly AS1 can be disposed between associated sprung and unsprung masses of an associated vehicle in any suitable manner. For example, one end member can be operatively connected to the associated sprung mass with the other end member (or end member assembly) disposed toward and operatively connected to the associated unsprung mass. In the arrangement shown in FIG. 2, for example, end member 300 is secured along a first or upper structural component USC, such as associated vehicle body BDY in FIG. 1, for example, and can be secured thereon in any suitable manner. For example, one or more securement devices, such as mounting studs 308, for example, can be included along end member 300. In some cases, the one or more securement devices (e.g., mounting studs 308) can project outwardly from end member wall 302 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 310 or other securement devices, for example. As an alternative to one or more of mounting studs 308, one or more threaded passages (e.g., blind passages and/or through passages) could be used in conjunction with a corresponding number of one or more threaded fasteners.

Additionally, one or more fluid communication ports or transfer passages can optionally be provided to permit fluid communication with the spring chamber, such as may be used for transferring pressurized gas into and/or out of the spring chamber, for example. In the exemplary embodiment shown, a transfer passage 312 can extend through one or more of mounting studs 308 and can be in fluid communication with spring chamber 212. It will be appreciated, however, that any other suitable fluid communication arrangement could alternately be used.

End member assembly EM1 can be of any suitable type, kind, construction and/or configuration, and can be operatively connected or otherwise secured to the flexible spring member in any suitable manner. In the exemplary arrangement shown in FIGS. 2-5, for example, end member assembly EM1 can include an end member body 400 and a support column 500 that are operatively engaged within one another. End member assembly EM1 can be broadly characterized as being of a type and kind that is commonly referred to as a piston (or a roll-off piston) and that has an outer surface 402 that abuttingly engages outer surface 208 of flexible spring member 200 such that a rolling lobe 220 is formed therealong. As assembly AS1 is displaced between extended and collapsed conditions, rolling lobe 220 is displaced along outer surface 402 in a conventional manner.

It will be appreciated that end member assembly EM1 can be secured on or along a second or lower structural component LSC, such as an axle AXL in FIG. 1, for example, in any suitable manner. As one example, lower structural component LSC could include one or more mounting holes HLS extending therethrough. In such case, a mounting stud 502 could extend from support column 500 and could extend through one of mounting holes HLS to receive a corresponding threaded nut 504, for example. Additionally, end member body 400 can be received on or along support column 500 and retained thereon in a suitable manner such that end member assembly EM1 can be secured to lower structural component LSC.

End member body 400 can extend longitudinally between an end 404 and an end 406 opposite end 404. End member body 400 can include a longitudinally-extending outer side wall 408 that extends peripherally about axis AX and at least partially defines outer surface 402. End member body 400 can also include an inner side wall 410 that extends peripherally about axis AX and at least partially defines a passage 412 extending longitudinally through the end member body. Additionally, end member body 400 can include an end wall 414 disposed along end 404 and an end wall 416 disposed along end 406 with end walls 414 and 416 extending generally transverse to axis AX. In a preferred arrangement, end walls 414 and 416 can extend between and operatively interconnect outer side wall 408 and inner side wall 410 such that outer side wall 408, inner side wall 410 and end walls 414 and 416 at least partially define an end member chamber 418. In a preferred construction, end member chamber 418 can extend peripherally about and substantially surround passage 412.

In some cases, the end member chamber can be in fluid communication with spring chamber 212 and/or an external atmosphere EXT. It will be appreciated that such fluid communication can be achieved in any suitable manner. For example, the end member body can include one or more passages extending through one or more of the walls thereof (e.g., one or more of outer side wall 408, inner side wall 410, end wall 414 and/or end wall 416). As one example, in the arrangement shown in FIGS. 4 and 5, end member body 400 includes passages 420 that extend through end wall 414 such that end member chamber 418 is disposed in fluid communication with spring chamber 212. In this manner, pressurized gas can be transferred into, out of and/or otherwise between end member chamber 418 and spring chamber 212.

Depending upon the size, shape, configuration and/or arrangement of passages 420, assembly AS1 may be capable of generating at least some measure of pressurized gas damping. Additionally, or in the alternative, other pressurized gas damping features and/or constructions can optionally be included, such as is discussed in greater detail hereinafter. It will be appreciated that depending upon the magnitude of gas damping performance provided, assemblies according to the subject matter of the present disclosure (e.g., assembly AS1) may be referred to herein as gas spring assemblies and/or gas spring and gas damper assemblies. In cases in which at least some measure of pressurized gas damping is present, such terms may be used interchangeably and are not intended to be limiting.

Figure 4:
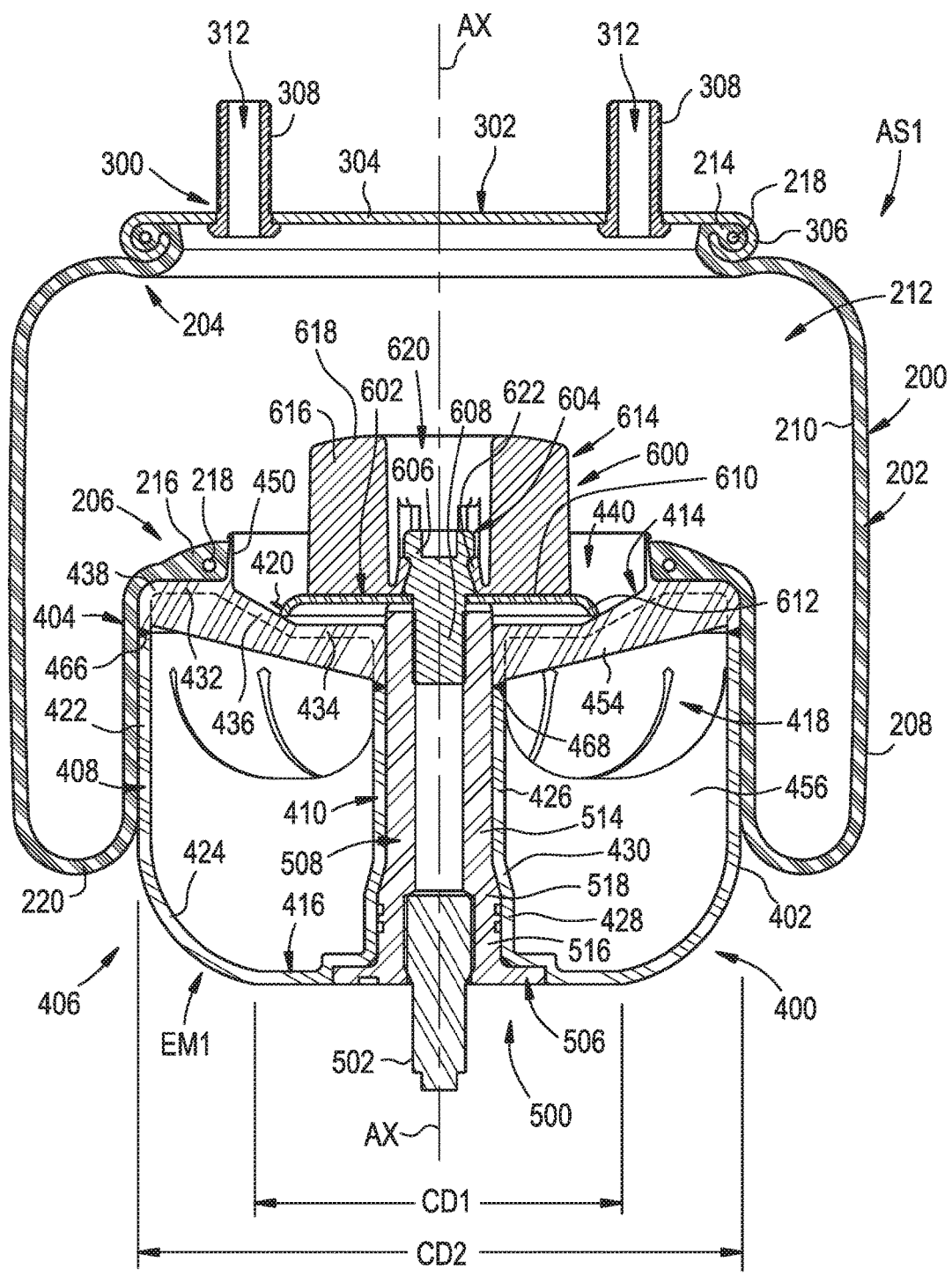
FIG. 4 is a cross-sectional side view of the gas spring assembly shown in FIGS. 2 and 3 taken from along line 4-4 in FIG. 3.

As indicated above, it will be appreciated that end member body 400 can be formed from any suitable combination of one or more walls that can include any suitable number of one or more wall portions. In the arrangement shown in FIGS. 2-5, for example, outer side wall 408 can have a cross-sectional profile or shape that includes a plurality of wall portions, such as wall portions 422 and 424, for example. Wall portion 422 of outer side wall 408 is shown as being approximately linear and disposed in approximate alignment with axis AX such that outer side wall 408 has an approximately cylindrical shape along wall portion 422. Wall portion 424 is shown as extending between wall portion 422 and end wall 416, and can have a curved or curvilinear shape. As a result, end wall 416, which extends transverse to axis AX, can have a cross-sectional dimension, which is represented in FIG. 4 by reference dimension CD1, across an outer peripheral extent that is less than a cross-sectional dimension of outer side wall 408, which is represented in FIG. 4 by reference dimension CD2. In this manner, end member body 400 can have a rounded overall shape along wall portion 424 of outer side wall 408.

Figure 5:
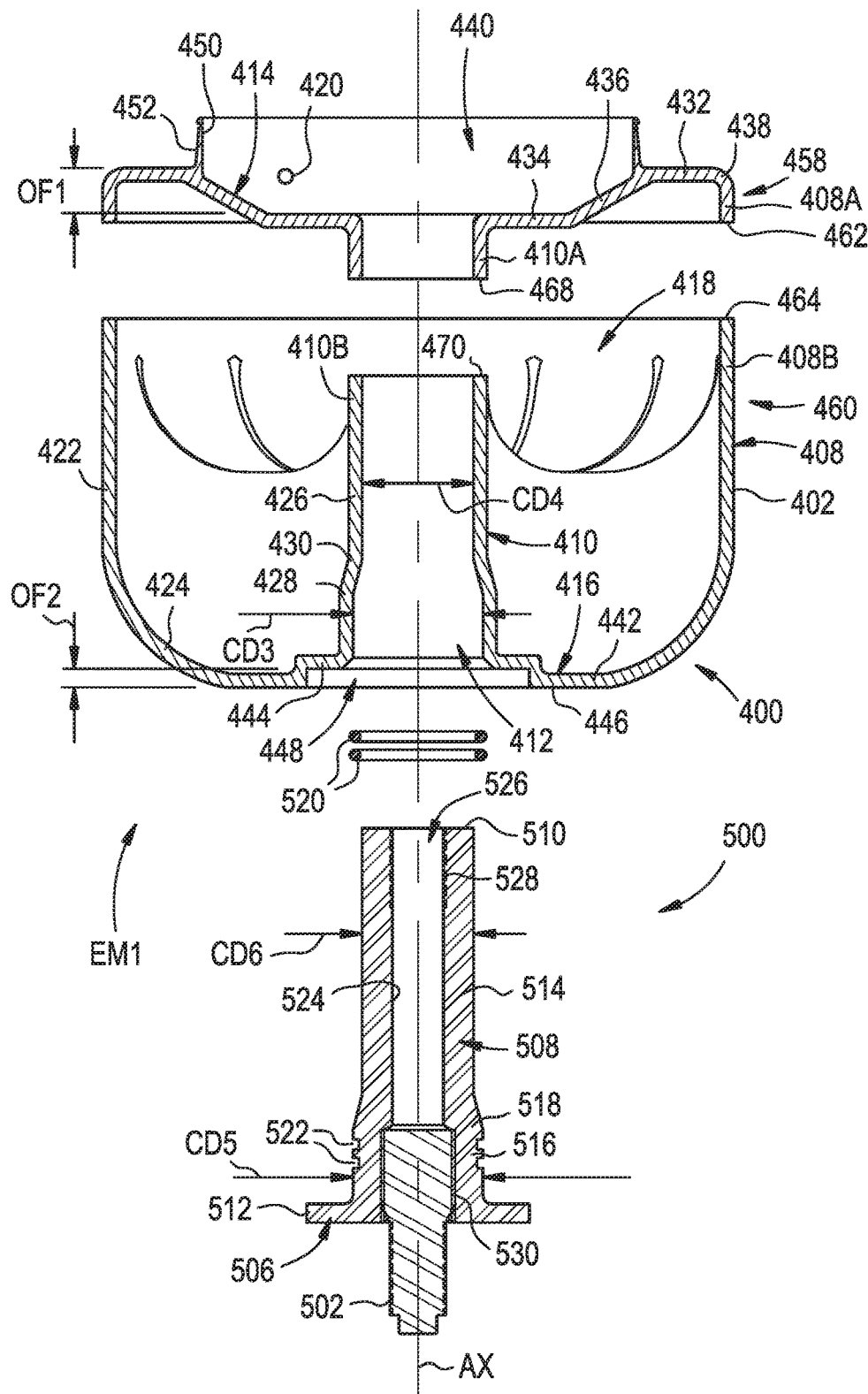
FIG. 5 is an exploded, cross-sectional side view of the exemplary end member assembly shown in FIGS. 2-4.

Additionally, inner side wall 410 can have a cross-sectional profile or shape that includes a plurality of wall portions, such as wall portions 426, 428 and 430, for example. Wall portions 426 and 428 are shown as being approximately linear and disposed in approximate alignment with axis AX such that inner side wall 410 has an approximately cylindrical shape along wall portions 426 and 428. However, a cross-sectional dimension of wall portion 428 is shown as being greater than a corresponding cross-sectional dimension of wall portion 426, as is represented in FIG. 5 by reference dimensions CD3 and CD4, respectively. Wall portion 430 is shown as extending between and operatively interconnecting wall portions 426 and 428, and can be of any suitable profile or shape, such as linear, curved, tapered and/or frustoconical, for example.

End wall 414 can extend transverse to axis AX and can have a cross-sectional profile or shape that includes a plurality of wall portions, such as wall portions 432, 434 and 436, for example. Wall portion 432 is disposed radially outward from wall portion 434 and transitions into outer side wall 408 at a shoulder 438. Wall portion 434 is disposed radially inward from wall portion 432 and extends in axially-offset alignment relative to wall portion 432, as is represented by reference dimension OF1, such that a recess or cavity 440 extends into end member body 400 from along end wall 414. Wall portion 436 extends between and operatively interconnects wall portions 432 and 434, and can have any suitable profile or shape, such as linear, curved, tapered and/or frustoconical, for example.

End wall 416 can extend transverse to axis AX and can have a cross-sectional shape that includes a plurality of wall portions, such as wall portions 442 and 444, for example. Wall portion 442 is disposed radially outward from wall portion 444 and can have an approximately linear shape such that a substantially planar bottom surface 446 of end member body 400 can be formed thereby. Wall portion 444 extends in axially-offset alignment from wall portion 442, as is represented in FIG. 5 by reference dimension OF2. In this manner, wall portion 444 can at least partially define a pocket or recess 448 extending into end member body 400 from along end wall 416.

As indicated above, flexible spring member 200 can be secured on or along end member body 400 in any suitable manner. One example of a connection between the flexible spring member and the end member is shown in FIG. 4 in which end member body 400 includes a connector wall 450 that can extend longitudinally outward from along end wall 412 in a direction away from end 406. End 206 of flexible spring member 200 can be received along an outer surface 452 of connector wall 450 such that a substantially fluid-tight seal is formed therebetween. It is to be understood, however, that the arrangement shown and described is merely exemplary and that any other suitable construction and/or configuration can alternately be used.

In some cases, end member body 400 can include one or more support walls that extend between and operatively interconnect one of more of outer side wall 408, inner side wall 410, end walls 414 and 416 and/or any wall portions or segments thereof. For example, a plurality of support walls 454 can extend between and operatively interconnect outer side wall 408, inner side wall 410 and end wall 414. In a preferred arrangement, support walls 454 can be disposed about axis AX such that the support walls are arranged in spaced-apart relation to one another. Additionally, or in the alternative, a plurality of support walls 456 can extend between and operatively interconnect outer side wall 408, inner side wall 410 and end wall 416. Again, in a preferred arrangement, support walls 456 can be disposed around axis AX such that the support walls are arranged in spaced-apart relation to one another.

As indicated above, end member body 400 can be of any suitable configuration and/or construction, and can be assembled from any suitable combination of components. As one example, end member body 400 is shown in FIGS. 4 and 5 as including body sections 458 and 460 that can be secured to one another in a manner suitable for forming end member body 400. Body section 458 can include end wall 414 as well as a segment 408A of outer side wall 408 and a segment 410A of inner side wall 410. In some cases, body section 458 can include one or more of support walls 454, if provided. Body section 460 can include end wall 416 as well as a segment 408B of outer side wall 408 and a segment 410B of inner side wall 410. In some cases, body section 460 can also include one or more of support walls 456, if provided.

Body sections 458 and 460 can be operatively secured to one another by way of any suitable connection, joint or combination thereof. For example, segment 408A is shown as terminating at a segment edge 462 and segment 408B is shown as terminating at a segment edge 464. Segment edges 462 and 464 can be disposed in abutting engagement with one another and a flowed-material joint 466 can extend between segments 408A and 408B along segment edges 462 and 464 such that a substantially fluid-tight connection can be formed between body sections 458 and 460. Additionally, or in the alternative, segment 410A is shown as terminating at a segment edge 468 and segment 410B is shown as terminating at a segment edge 470. Segment edges 468 and 470 can be disposed in abutting engagement with one another and a flowed-material joint 472 can extend between segments 410A and 410B along segment edges 468 and 470 such that a substantially fluid-tight connection can be formed between body sections 458 and 460.

Additionally, it will be appreciated that the one or more walls and/or one or more wall portions of end member body 400 can be of any suitable size, shape, configuration and/or arrangement, and can be formed from any suitable material or combination of materials, such as metal materials (e.g., steel or aluminum) and/or polymeric materials. Non-limiting examples of polymeric materials can include fiber-reinforced polypropylene, fiber-reinforced polyamide, unreinforced (i.e., relatively high-strength) polyester, polyethylene, polyamide, polyether or any combination thereof.

Support column 500 can include one or more walls having any number of one or more wall portions that are dimensioned to operatively engage end member body 400 and at least partially secure the end member body on or along an associated structural component, such as lower structural component LSC, for example. It will be appreciated that the one or more walls and one or more wall portions of support column 500 can be of any suitable size, shape, configuration and/or arrangement, and can be formed from any suitable material or combination of materials, such as metal materials (e.g., steel or aluminum) and/or polymeric materials. Non-limiting examples of polymeric materials can include fiber-reinforced polypropylene, fiber-reinforced polyamide, unreinforced (i.e., relatively high-strength) polyester, polyethylene, polyamide, polyether or any combination thereof.

In the arrangement shown in FIGS. 4 and 5, for example, support column 500 can include a base wall 506 disposed transverse to the longitudinal axis AX and a column wall 508 that extends longitudinally from along base wall 506 toward a distal end 510. Base wall 506 extends radially outward to an outer peripheral edge 512 and can be dimensioned to be at least partially received within recess 448 formed along end wall 416 of end member body 400.

Column wall 508 can have a cross-sectional profile or shape that includes a plurality of wall portions, such as wall portions 514, 516 and 518, for example. Wall portion 514 extends from distal end 510 toward base wall 506, and wall portion 516 extends from base wall 506 in a direction toward distal end 510. Wall portions 514 and 516 are shown as being approximately linear and disposed in approximate alignment with axis AX such that column wall 508 has an approximately cylindrical shape along wall portions 514 and 516. A cross-sectional dimension of wall portion 516 is shown as being greater than a corresponding cross-sectional dimension of wall portion 514, as is represented in FIG. 5 by reference dimensions CD5 and CD6, respectively. Wall portion 518 is shown as extending between and operatively interconnecting wall portions 514 and 516, and can be of any suitable profile or shape, such as linear, curved, tapered and/or frustoconical, for example.

In a preferred arrangement, column wall 508 can have a size and shape that is cooperative with the size and shape of inner side wall 410 and passage 412. It will be appreciated that the configuration and arrangement of inner side wall 410 and end wall 416 of end member body 400 together with the configuration and arrangement of base wall 506 and column wall 508 of support column 500 will prevent the support column from passing fully through passage 412. As such, positioning one or more walls and/or wall portions of support column 500 in abutting engagement with one or more walls and/or wall portions of end member body 400 and retaining the end member body and support column in such a relationship can generate an end member assembly, such as end member assembly EM1, for example.

It may be desirable, in some cases, to provide a substantially fluid-tight connection or interface between end member body 400 and support column 500. It will be appreciated that such a substantially fluid-tight interface can be provided in any suitable manner. As one example, one or more sealing elements 520 can be sealingly disposed between inner side wall 410 and column wall 508 such that a substantially fluid-tight seal can be formed therebetween. It will be appreciated that the one or more sealing elements can be secured in operative engagement between inner side wall 410 and column wall 508 in any suitable manner. As one example, one or more annular grooves (not shown) can extend into one or more of wall portions 426, 428 and/or 430 of inner side wall 410, and can be dimensioned to receive at least a portion of at least one of the sealing elements. As an additional or alternate example, one or more annular grooves can extend into one or more of wall portions 514, 516 and 518 of column wall 508. In the arrangement shown in FIGS. 4 and 5, for example, annular grooves 522 extends radially inward into column wall 508 along wall portion 516 and are dimensioned to receive one of sealing elements 520. It will be appreciated, however, that other configurations and/or arrangements could alternately be used.

Support column 500 can be adapted to receive and/or otherwise operatively engage one or more securement devices and/or features, such as may be suitable for securing the end member body on or along the support column and/or for securing the end member assembly on or along an associated structural component. It will be appreciated that such securement devices can be operatively connected on or along the support column in any suitable manner. As one example, one or more securement devices and/or features could be formed as integral parts of the support column. As another example, one or more securement devices and/or features could be embedded (e.g., molded) within the support column. As a further example, the support column can include one or more passages dimensioned to receive an associated securement device. In the arrangement shown in FIGS. 4 and 5, for example, column wall 508 can have an inside surface 524 that at least partially defines a passage 526 extending lengthwise through support column 500. One or more helical threads 528 can be formed on or along column wall 508, such as along inside surface 524 adjacent distal end 510.

Additionally, one or more helical threads 530 can be formed on or along column wall 508, such as along inside surface 524 adjacent base wall 506. In such case, mounting stud 502 can threadably engage helical threads 530 such that the mounting stud is retained on or along the column wall. Alternately, a portion of mounting stud 502 could be molded into or otherwise embedded within base wall 506 and/or column wall 508. As such, at least support column 500 can be secured on or along an associated structural component, such as lower structural component LSC, for example, by securing mounting stud 502 therealong.

Assembly AS1 can also include a retainer assembly 600 dimensioned for securement on or along end member assembly EM1. In some cases, retainer assembly 600 can be secured on or along one or more of end member body 400 and support column 500, and can aid in retaining end member assembly EM1 in an assembled condition. Additionally, it will be appreciated that the retainer assembly can include any number of one or more components, which can be used in any suitable combination, configuration and/or arrangement. As one example, retainer assembly 600 can include retaining plate 602 and a securement device 604 suitable for attaching retaining plate 602 on or along end member assembly EM1. In some cases, securement device 604 can include head 606 and a threaded shaft 608 that include one or more helical threads (not identified) that can be cooperative with corresponding threads of one or more other components, such as threads 528 of column wall 508, for example.

Retaining plate 602 is shown in FIGS. 4 and 5 as including a plate wall 610 that is disposed transverse to axis AX and extends radially outward to an outer peripheral edge 612. Plate wall 610 can have any suitable cross-sectional profile or shape. As one example, plate wall 610 can include a substantially planar, convex or frustoconical shape or profile along a central wall portion (not numbered) and a curvilinear shape or profile along outer peripheral edge 612. In some cases, a hole or opening (not identified) can extend through plate wall 610 and can be dimensioned to receive at least a portion of securement device 604. In such an arrangement, retaining plate 602 can be secured along end member assembly EM1 such that outer peripheral edge 612 is in abutting engagement with one of end member body 400 and/or support column 500. Additionally, retaining plate 602 can be urged toward end member assembly EM1 using securement device 604 and can act as a biasing element to assist in retaining end member body 400 and support column 500 in an assembled condition, such as by threadably engaging securement device 604 with threads 528 of column wall 508.

In some cases, a jounce bumper 614 can, optionally, be supported within spring chamber 212, such as to inhibit direct contact between end member 300 and end member assembly EM1, for example. It will be appreciated that the jounce bumper, if included, can be supported on or along the end member or end member assembly in any suitable manner. As one example, jounce bumper 614 can be secured on or along end member assembly EM1 and can be operatively connected with one of more of retaining plate 602 and/or securement device 604. In such cases, axially-applied loads and/or forces imparted on jounce bumper 614 by end member 300 can be transmitted through support column 500 to the associated structural component (e.g., lower structural component LSC). In such cases, a minimal or otherwise substantially reduced percentage of the magnitude of such loads and/or forces will be transmitted through end member body 400.

It will be appreciated that jounce bumper 614 can have any suitable configuration and/or construction. As one example, jounce bumper 614 can include a bumper body 616 with a distal end 618 disposed toward end member 300 and a central opening 620 extending therethrough. A plurality of retaining fingers 622 can project into central opening 620 from along bumper body 616 and can engage one or more corresponding engagement features (not numbered) disposed along head 606 of securement device 604. It will be appreciated, however, that other configurations and/or arrangements could alternately be used.

As indicated above, an assembly in accordance with the subject matter of the present disclosure can, optionally, include one or more pressurized gas damping features fluidically connected between the spring chamber and one or more gas damper reservoirs. For example, in addition, or in the alternative, to the constructions previously described, one or more elongated gas damping passages can be fluidically connected between the spring chamber and one or more gas damper reservoirs. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

As discussed above, a gas spring and gas damper assembly in accordance with the subject matter of the present disclosure can include an elongated gas damping passage in fluid communication between the spring chamber (e.g., spring chamber 212) and an associated gas damper reservoir (e.g., end member chamber 418). Differential pressure between the associated chambers (e.g., spring chamber 212 and end member chamber 418) can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-4 Hz, vibrations from 8-12 Hz and vibrations from 15-25 Hz.

As discussed above, the combination of cross-sectional area and overall length of the elongated gas damping passage can be dimensioned, sized and/or otherwise configured to generate gas flow having sufficient mass and sufficient velocity to achieve the desired level of pressurized gas damping. Generally, a gas spring and gas damper assembly in accordance with the subject matter of the present disclosure can include an elongated gas damping passage that has an overall length that is at least (10) times the maximum dimension of the cross-sectional shape (e.g., the diameter of a circular passage) of the elongated gas damping passage. In a preferred arrangement, the overall length of the elongated gas damping passage will be at least twenty (20) times the maximum dimension of the cross-sectional shape. Non-limiting examples of suitable ranges for dimensions of an elongated gas damping passage in accordance with the subject matter of the present disclosure can include an inside cross-sectional dimension (e.g., inside diameter) within a range of from approximately five (5) millimeters to approximately fifty (50) millimeters.

It will be appreciated that any such one or more elongated gas damping passages can be disposed within the associated assembly or otherwise provided in any suitable manner. In some cases, substantially all of the elongated gas damping passages can be provided outside of the spring chamber (e.g., outside of spring chamber 212), such as by extending within or through one of the end members (e.g., end member assembly EM1). Additionally, it will be appreciated that any such one or more elongated gas damping passages can be configured or otherwise arranged within the assembly in any suitable manner, such as by having one or more portions or sections that are linear, coiled, curved, serpentine or any combination of these and/or other configurations and/or arrangements. In some cases, performance benefits may be achieved by using a coiled or helical arrangement in comparison with other configurations.

As mentioned above, it will be appreciated that the one or more elongated gas damping passages can provided in any suitable manner and through the use of any suitable combination of one or more features, elements and/or components. For example, one or more elongated gas damping passages can be at least partially formed by one or more components that are provided separately from the one or more walls and/or wall portions of the end members. As another example, one or more elongated gas damping passages can be at least partially formed by one or more walls and/or wall portions of one or more of the end members and/or any one or more components thereof.

Figure 4A:
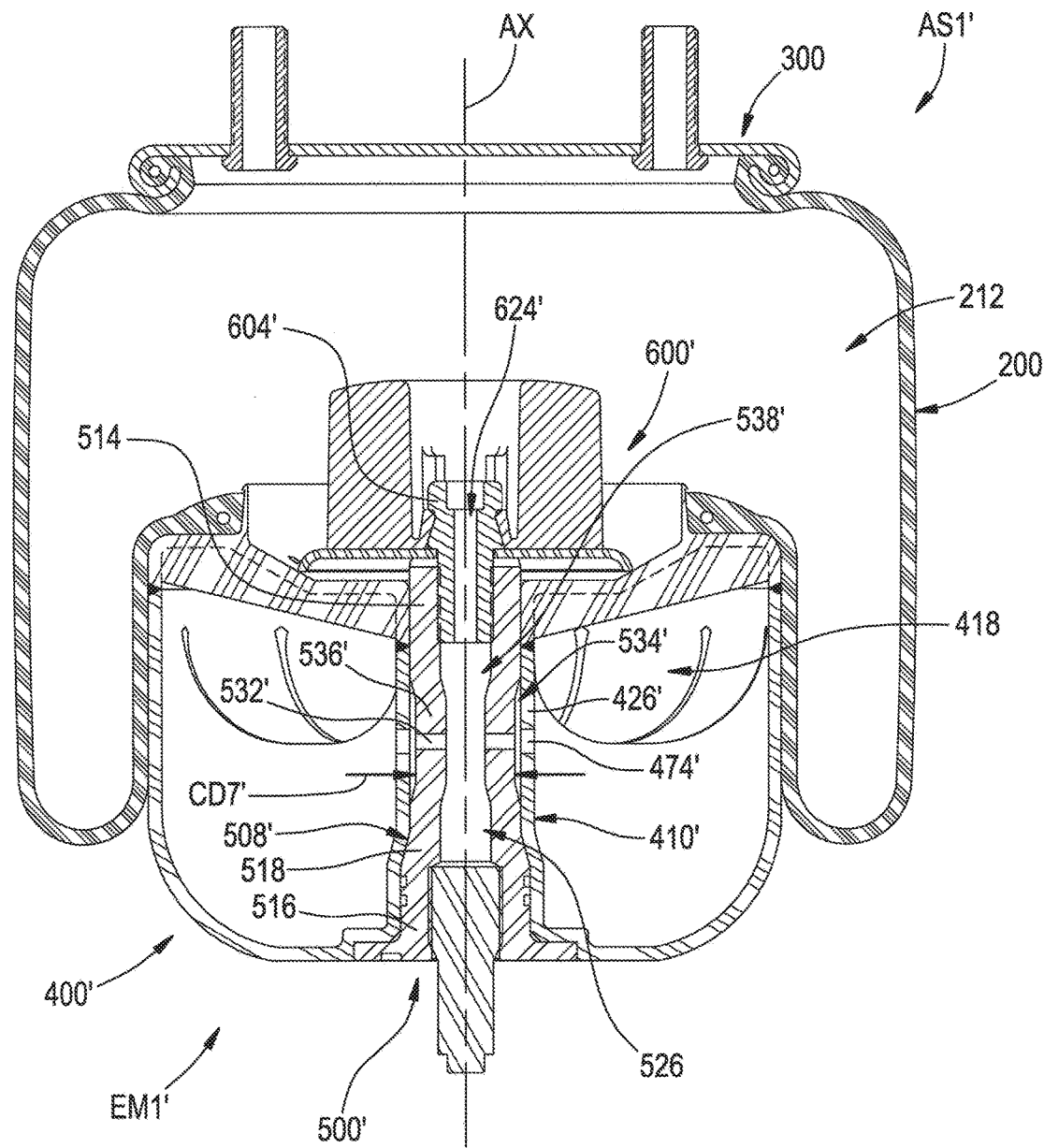
FIG. 4A is a cross-sectional side view of an alternate construction of the gas spring assembly shown in FIGS. 2-4 including an elongated gas damping passage.

As one non-limiting example, a gas spring and gas damper assembly AS1' is shown in FIG. 4A as including an end member assembly EM1' with an end member body 400', a support column 500' and a retainer assembly 600'. It will be appreciated that assembly AS1' and end member assembly EM1', respectively, are similar to assembly AS1 and end member assembly EM1, such as have been described above in detail. As such, like features and/or components will be identified by like item number and new or different features and/or components will be identified by primed (') item numbers.

End member body 400' differs from end member body 400 in at least that wall portion 426' of inner side wall 410' includes one or more ports or openings 474' extending therethrough and disposed in fluid communication with end member chamber 418. Support column 500' differs from support column 500 in that column wall 508' includes one or more ports or openings 532' extending therethrough in fluid communication with passage 526. In some cases, openings 532' can be indexed or otherwise maintained in approximate alignment with openings 474' such that passage 526 and end member chamber 418 can be disposed in fluid communication with one another through the openings. In other cases, an annular chamber 534' can be formed between end member body 400' and support column 500' to permit fluid communication between openings 474' and 532' regardless of the rotational orientation of support column 500' about axis AX relative to end member body 400'.

It will be appreciated that annular chamber 534', if provided, can be formed in any suitable manner. As one example, column wall 508' can include a wall portion 536' that extends peripherally about axis AX and is offset radially inward from wall portion 514', such as is represented in FIG. 4A by reference dimension CD7'. Wall portion 536' can be of any suitable length or dimension and can be disposed in any suitable position axially along column wall 508 to form annular chamber 534' in fluid communication between openings 474' and 532'. As one example, wall portion 536' can be disposed in axially-spaced relation relative to wall portions 516 and 518.

Retainer assembly 600' can differ from retainer assembly 600 in that securement device 604' can include an opening or passage 624' extending therethrough. In a preferred arrangement, passage 624' can be disposed in fluid communication between spring chamber 212 and passage 526. In this manner, an elongated gas damping passage 538' is formed that is at least substantially-entirely disposed within end member assembly EM1'. Elongated gas damping passage 538' extends between passage 624' disposed in fluid communication with spring chamber 212 and openings 474' disposed in fluid communication with end member chamber 418. As such, elongated gas damping passage 538' can generate pressurized gas damping as pressurized gas is displaced through the elongated gas damping passage during extension and compression of assembly AS1' during use.

The elongated gas damping passage will have an overall length (not represented) and a cross-sectional shape with a minimum and a maximum cross-sectional dimension. In some cases, the minimum and maximum cross-sectional dimensions may be substantially similar. In other cases, such as is shown in FIG. 4A, the minimum and maximum cross-sectional dimensions may vary from one another. Non-limiting examples of suitable cross-sectional shapes for the elongated gas damping passage (e.g., passage 538') can include approximately circular, ovoid, elliptical, rectangular, square and/or other curved or polygonal shapes. In some cases, the cross-sectional shape may be substantially uniform along the length of the passage. In other cases, different sections or portions of the elongated gas damping passage can have different cross-sectional shapes.

Figure 4B:
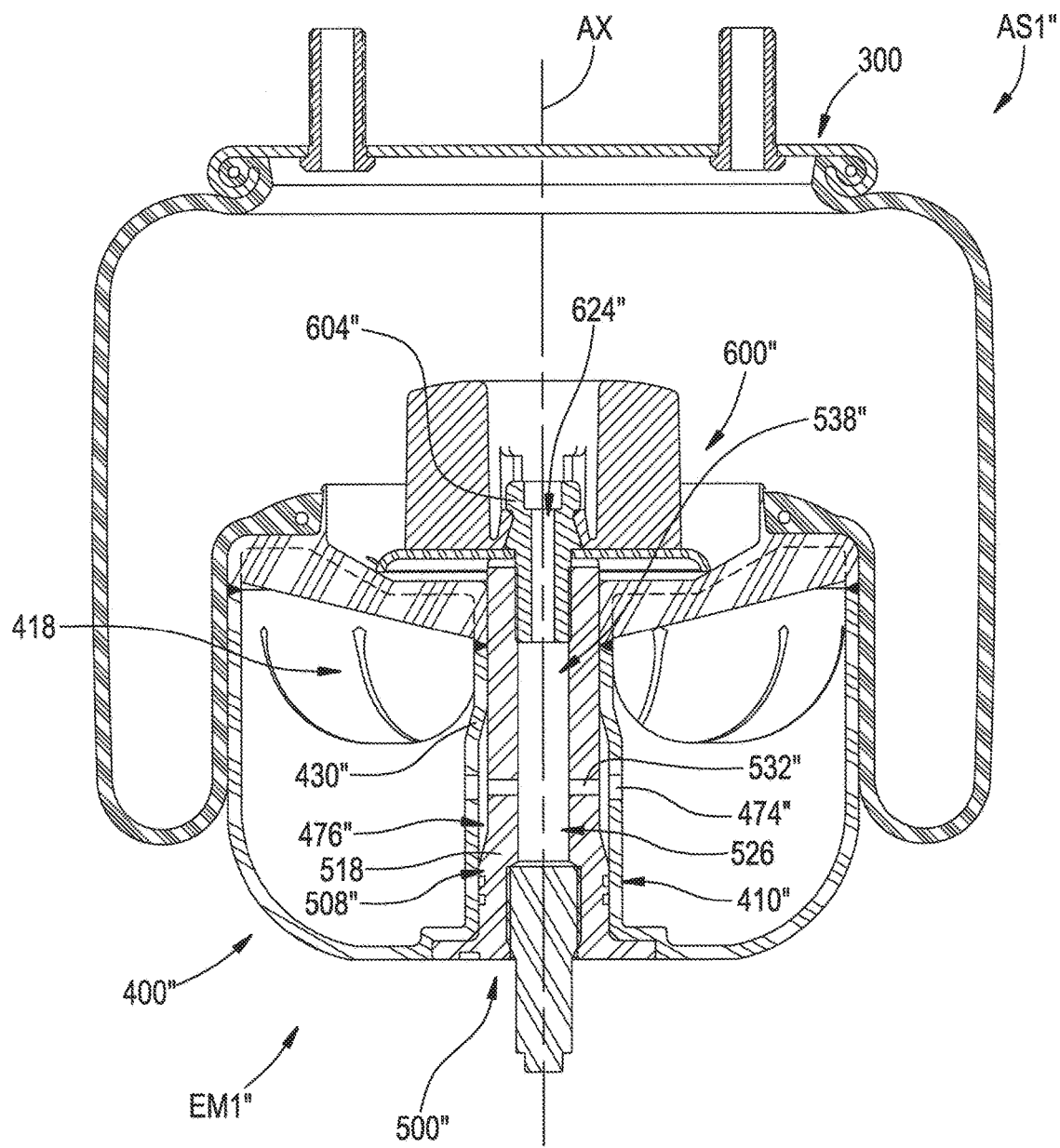
FIG. 4B is a cross-sectional side view of another alternate construction of the gas spring assembly shown in FIGS. 2-4 including an elongated gas damping passage.

As another non-limiting example, a gas spring and gas damper assembly AS1" is shown in FIG. 4B as including an end member assembly EM1" with an end member body 400", a support column 500" and a retainer assembly 600". It will be appreciated that assembly AS1" and end member assembly EM1", respectively, are similar to assembly AS1 and end member assembly EM1, such as have been described above in detail. As such, like features and/or components will be identified by like item number and new or different features and/or components will be identified by double-primed (") item numbers.

End member body 400" differs from end member body 400 in at least that wall portion 426" of inner side wall 410" includes one or more ports or openings 474" extending therethrough and disposed in fluid communication with end member chamber 418. Support column 500" differs from support column 500 in that column wall 508" includes one or more ports or openings 532" extending therethrough in fluid communication with passage 526. In some cases, openings 532" can be indexed or otherwise maintained in approximate alignment with openings 474" such that passage 526 and end member chamber 418 can be disposed in fluid communication with one another through the openings. In other cases, an annular chamber 476" can be formed between end member body 400" and support column 500" to permit fluid communication between openings 474" and 532" regardless of the rotational orientation of support column 500" about axis AX relative to end member body 400".

It will be appreciated that annular chamber 476", if provided, can be formed in any suitable manner. As one example, end member body 400" differs from end member body 400 in at least that wall portion 430" is disposed in axially-spaced relation relative to wall portion 518 of column wall 508. Whereas, wall portion 430 is shown in FIG. 4 as being disposed adjacent wall portion 518 of column wall 508. As a result, annular chamber 476" is defined between the end member body and the support column.

Retainer assembly 600" can differ from retainer assembly 600 in that securement device 604" can include an opening or passage 624" extending therethrough. In a preferred arrangement, passage 624" can be disposed in fluid communication between spring chamber 212 and passage 526. In this manner, an elongated gas damping passage 534" is formed that is at least substantially-entirely disposed within end member assembly EM1". Elongated gas damping passage 534" extends between passage 624" disposed in fluid communication with spring chamber 212 and openings 474" disposed in fluid communication with end member chamber 418. As such, elongated gas damping passage 534" can generate pressurized gas damping as pressurized gas is displaced through the elongated gas damping passage during extension and compression of assembly AS1" during use.

The elongated gas damping passage will have an overall length (not represented) and a cross-sectional shape with a minimum and a maximum cross-sectional dimension. In some cases, the minimum and maximum cross-sectional dimensions may be substantially similar. In other cases, such as is shown in FIG. 4B, the minimum and maximum cross-sectional dimensions may vary from one another. Non-limiting examples of suitable cross-sectional shapes for the elongated gas damping passage (e.g., passage 534") can include approximately circular, ovoid, elliptical, rectangular, square and/or other curved or polygonal shapes. In some cases, the cross-sectional shape may be substantially uniform along the length of the passage. In other cases, different sections or portions of the elongated gas damping passage can have different cross-sectional shapes.

As indicated above, the one or more elongated gas damping passages can be formed in any suitable manner and from any suitable combination of features, elements and/or components. In the arrangement shown in FIGS. 4A and 4B, elongated gas damping passages 538' and 534" are shown as being at least partially formed by openings and passages extending through a plurality of components. It will be appreciated, however, that the arrangements disclosed are merely exemplary and that any other configurations and/or arrangements could alternately be used.

Though not shown in the drawings, it will be recognized and appreciated that elongated gas damping passages in accordance with the subject matter of the present disclosure, such as have been described above, for example, are equally applicable for use in connection with other assemblies shown and described herein, without limitation. Accordingly, the foregoing discussion of the implementation and use of elongated gas damping passages is intended to be interpreted as if such discussion was repeated in connection with the other embodiments shown and described herein.

Figure 6:
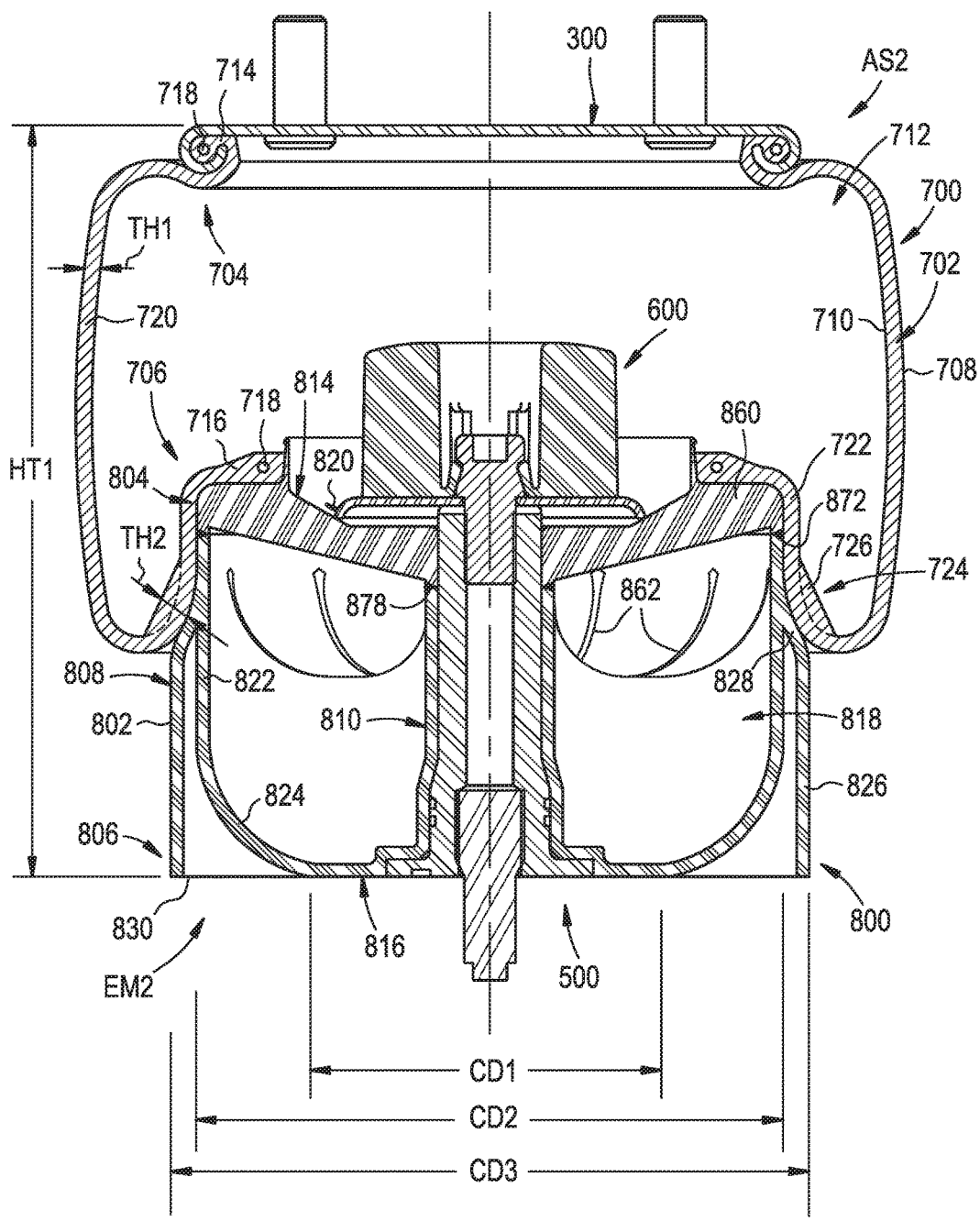
FIG. 6 is a cross-sectional side view of another example of a gas spring assembly including a flexible spring member and an end member assembly in accordance with the subject matter of the present disclosure.
Figure 6A:
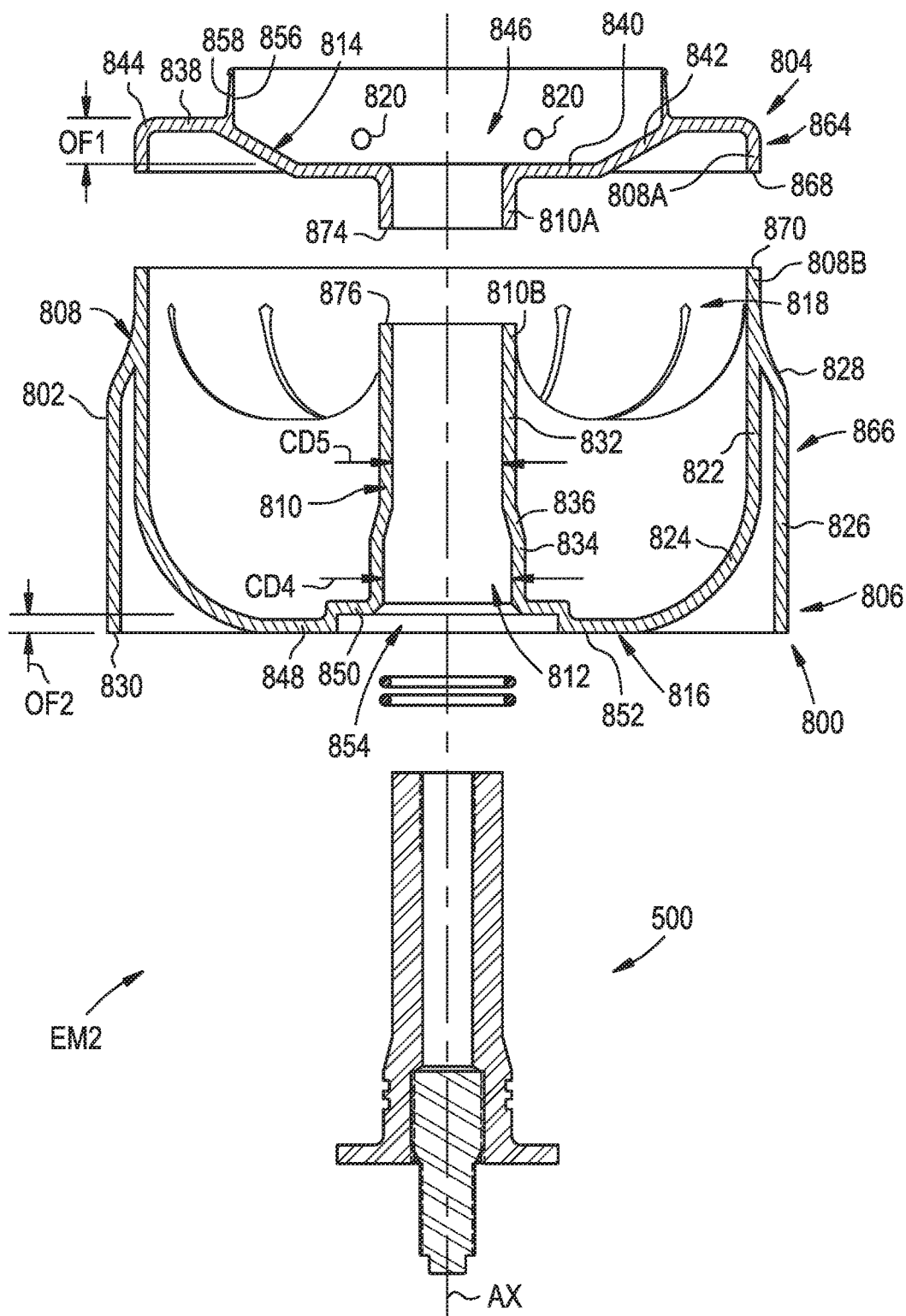
FIG. 6A is an exploded, cross-sectional side view of the exemplary end member assembly shown in FIG. 6.
Figure 7:
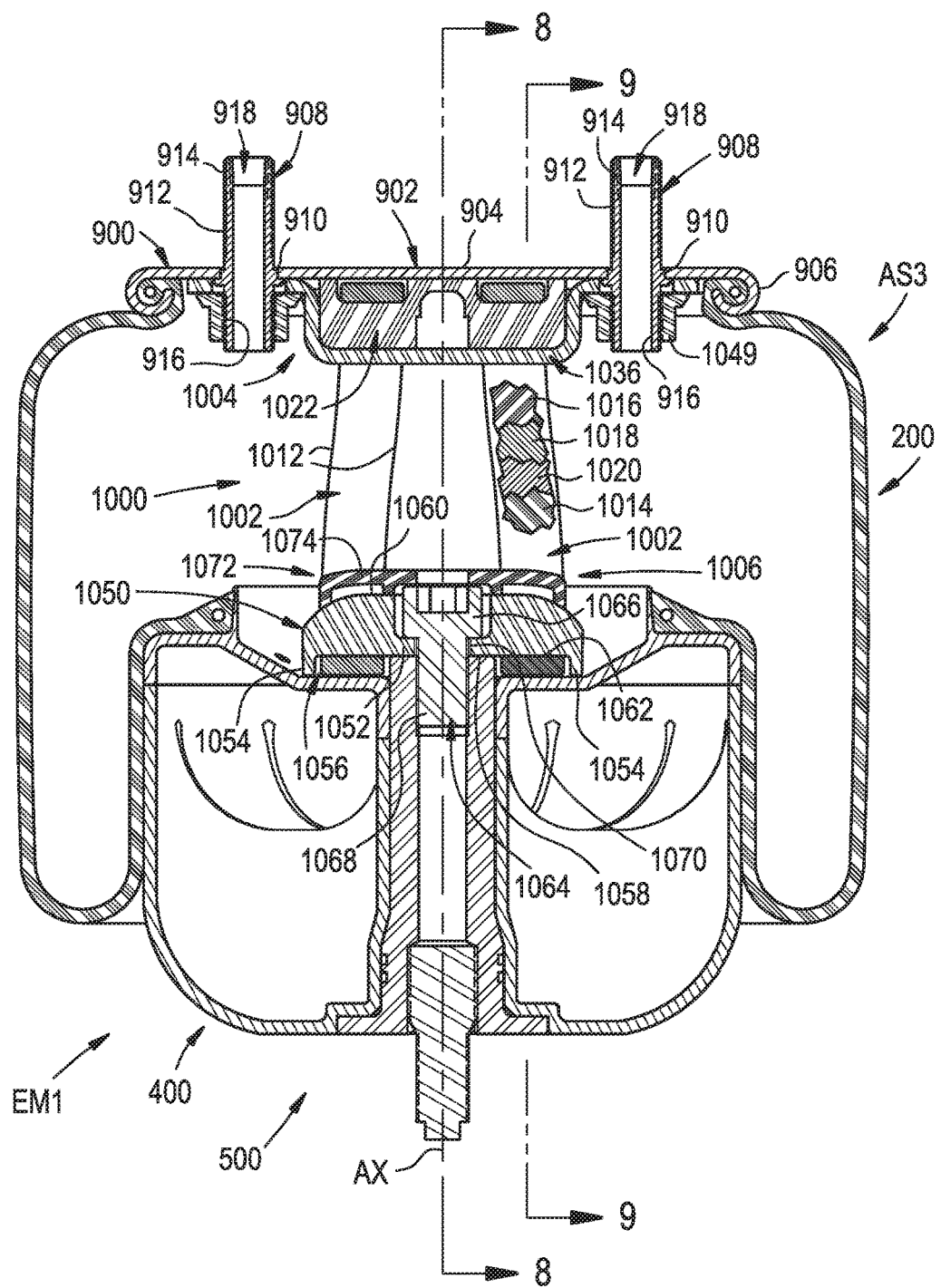
FIG. 7 is a cross-sectional side view of yet another example of a gas spring assembly including an end member assembly and a restraint assembly in accordance with the subject matter of the present disclosure.
Figure 8:
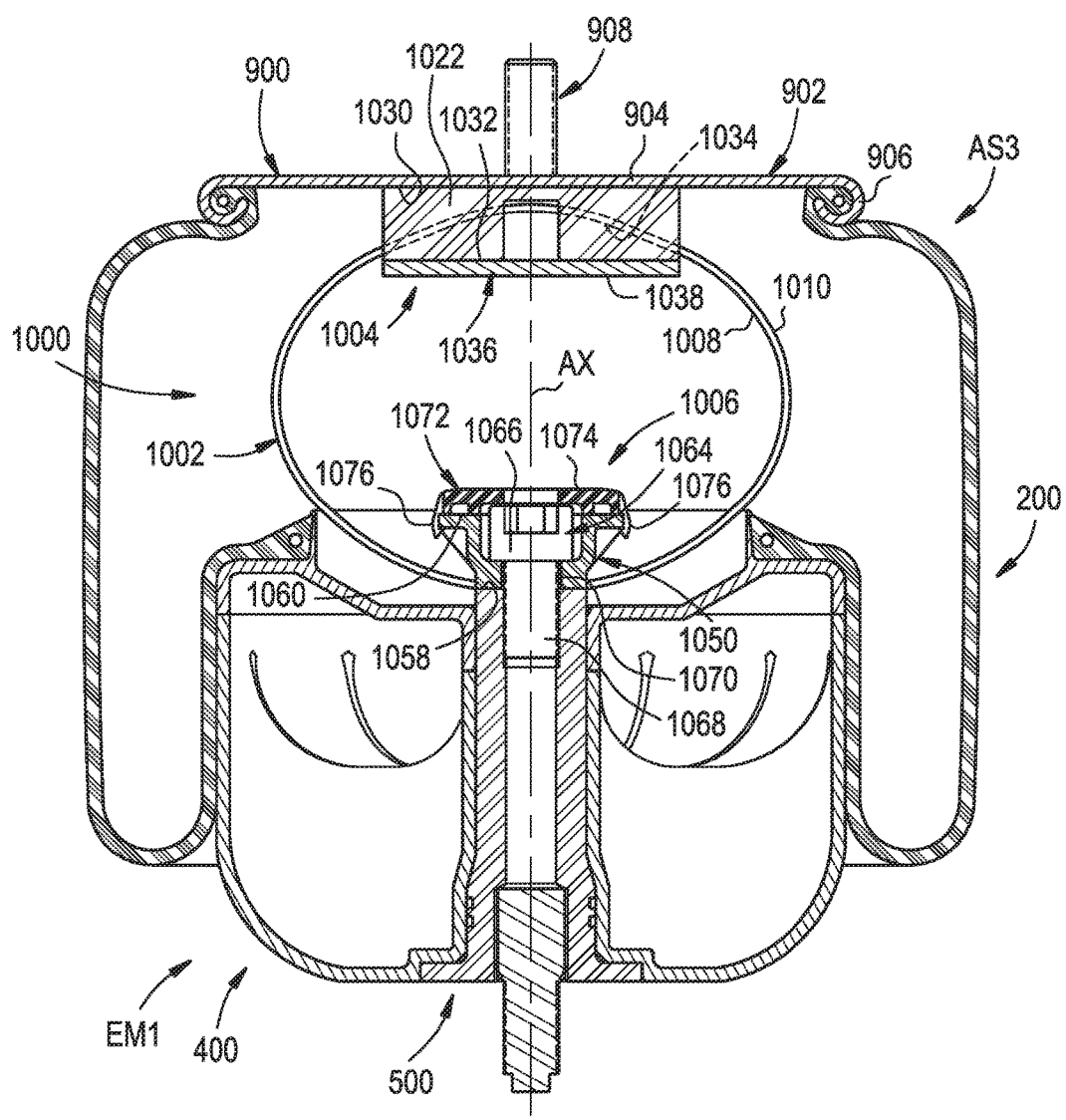
FIG. 8 is a cross-sectional view of the gas spring assembly in FIG. 7 taken from along line 8-8 therein.
Figure 9:
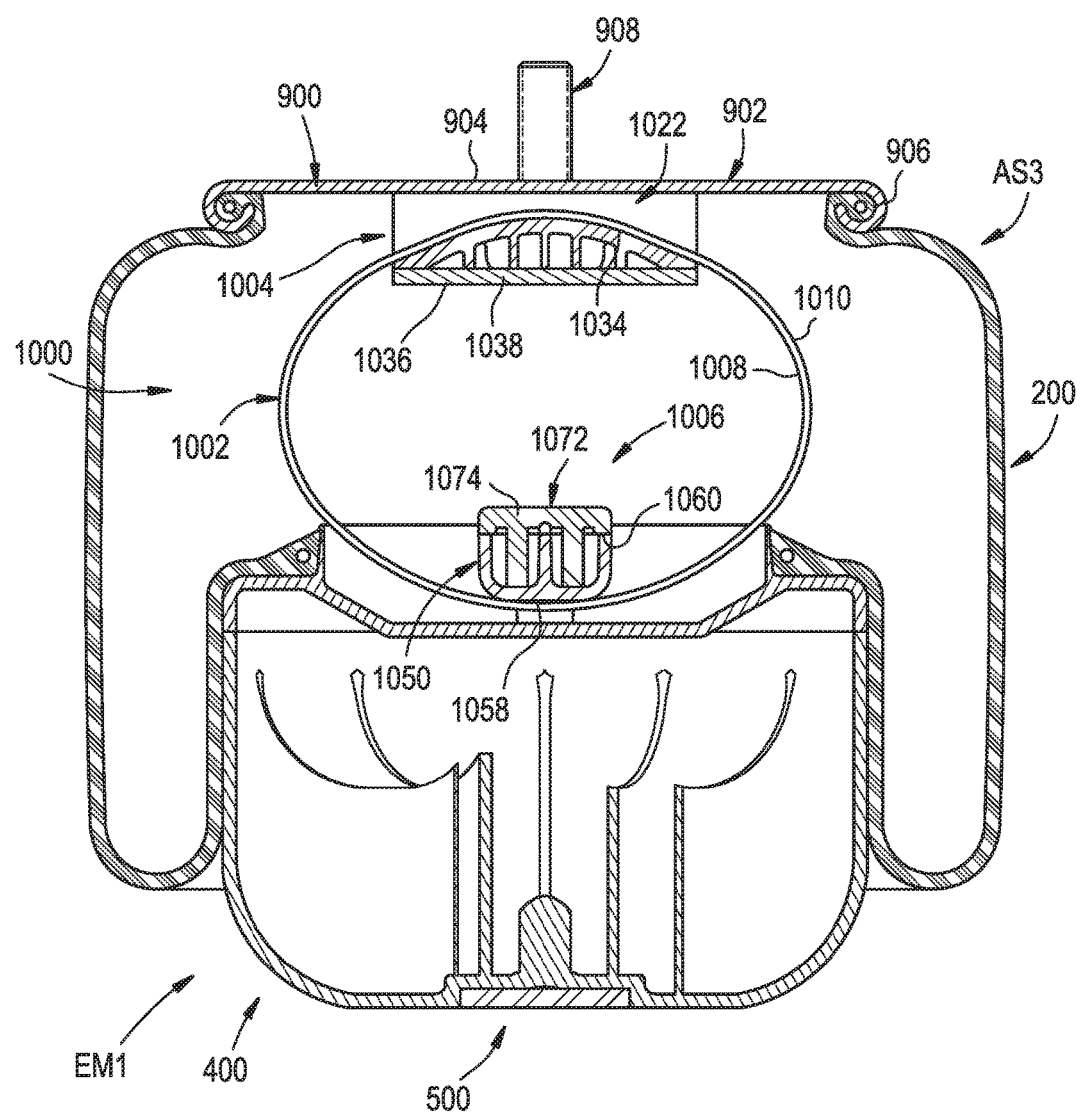
FIG. 9 is a cross-sectional view of the gas spring assembly in FIGS. 7 and 8 taken from along line 9-9 in FIG. 7.
Figure 10:
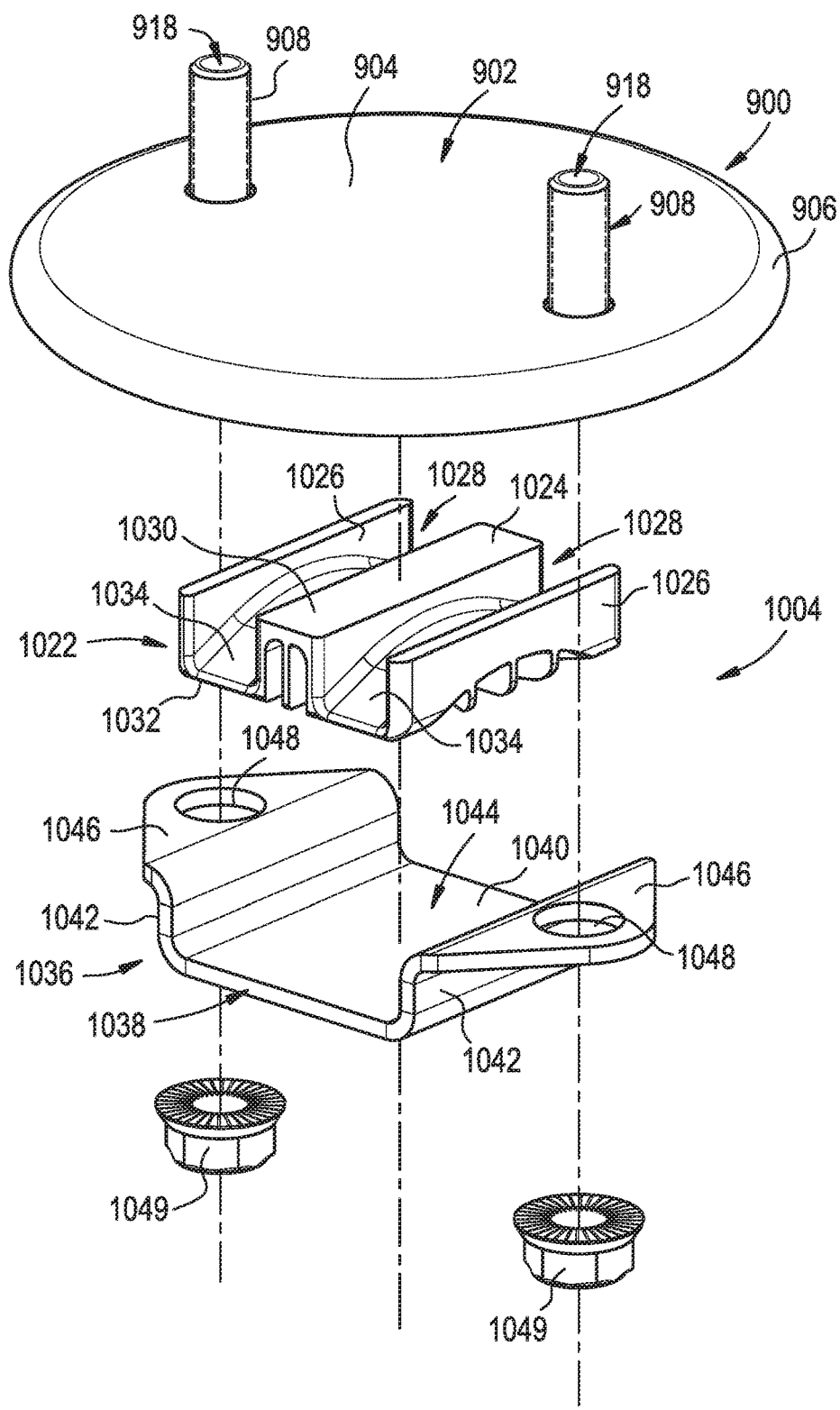
FIG. 10 is an exploded perspective view of a portion of the gas spring assembly shown in FIGS. 7-9.
Figure 11:
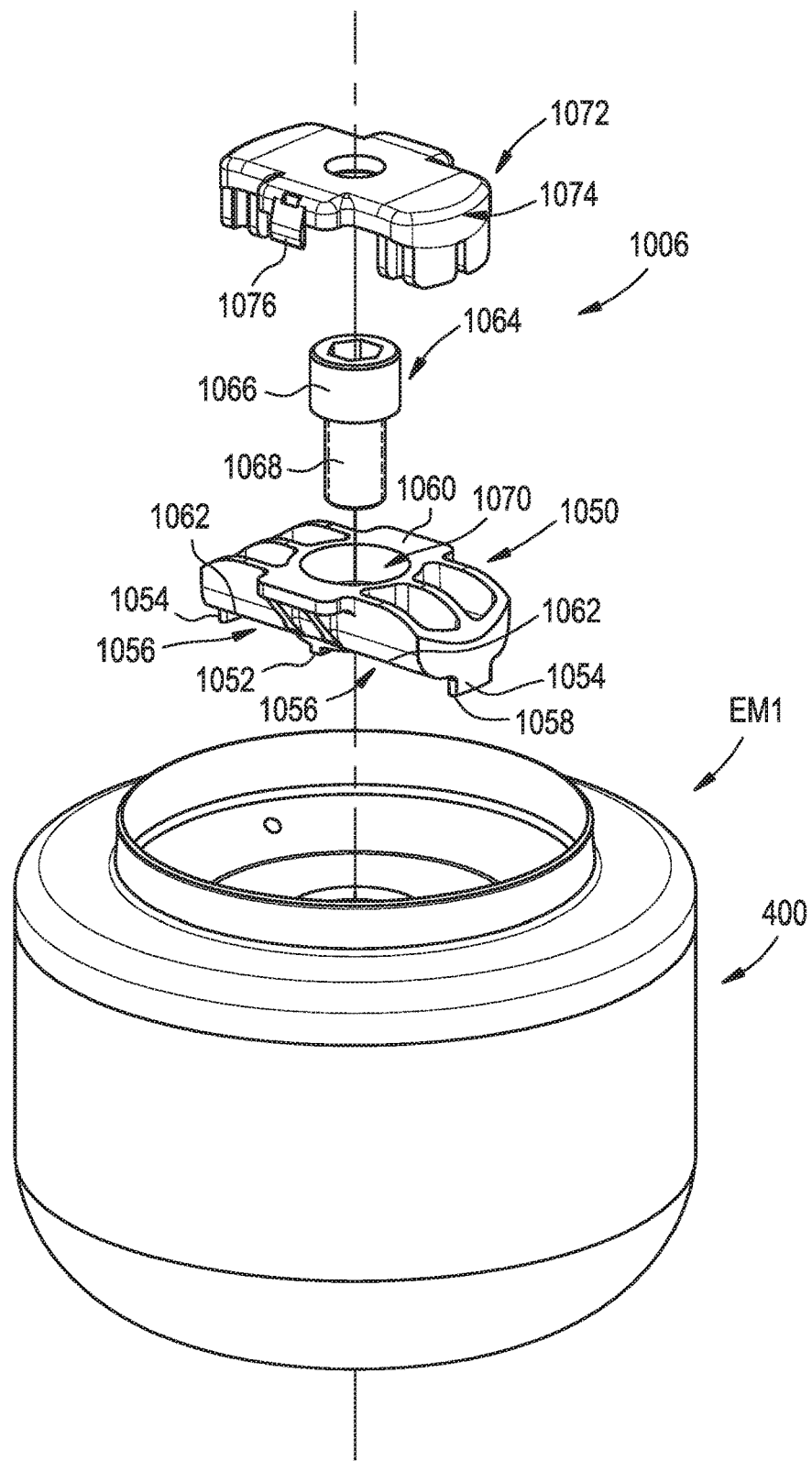
FIG. 11 is an exploded perspective view of another portion of the gas spring assembly shown in FIGS. 7-9.

Another example of an assembly AS2 in accordance with the subject matter of the present disclosure, such as may be suitable for use as assemblies 102 in FIG. 1, for example, is shown in FIGS. 6 and 6A. Assembly AS2 can have a longitudinal axis AX and can include a flexible spring member 700 as well as end member 300 and an end member assembly EM2 that are operatively connected to the flexible spring member. For purposes of brevity and ease of reading, a detailed description of end member 300 is not repeated here. However, it is to be distinctly understood that the foregoing description of end member 300 as well as the operation and interconnection thereof as a component of assembly AS1 (including interconnection with flexible spring member 200 thereof) is equally applicable to use as a component of assembly AS2 (including interconnection with flexible spring member 700 thereof).

It will be appreciated that flexible spring member 700 can be of any suitable size, shape, construction and/or configuration. Flexible spring member 700 is shown in FIG. 6 as including a flexible wall 702 that can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 702 can extend in a generally longitudinal direction between opposing ends 704 and 706. Additionally, flexible wall 702 can include an outer surface 708 and an inner surface 710, which can at least partially define a spring chamber 712. Flexible wall 702 can include an outer or cover ply (not identified) that at least partially forms outer surface 708. Flexible wall 702 can also include an inner or liner ply (not identified) that at least partially forms inner surface 710. In some cases, flexible wall 702 can further include one or more reinforcing plies (not shown) disposed between outer and inner surfaces 708 and 710. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 700 can include any feature or combination of features suitable for forming a substantially fluid-tight connection with end member 300 and/or end member assembly EM2. As one example, flexible wall 702 can include a mounting bead 714 disposed along end 704 and a mounting bead 716 disposed along end 706. In such cases, the mounting bead, if provided, can, optionally, include a reinforcing element, such as an endless, annular bead wire 718, for example.

Flexible wall 702 also includes a plurality of flexible wall sections that extend peripherally about axis AX, such as flexible wall sections 720, 722 and 724, for example. Flexible wall section 720 extends from along end 704 and/or mounting bead 714 toward end 706. Flexible wall section 722 extends from along end 706 and/or mounting bead 716 toward end 704. Flexible wall section 724 is disposed between flexible wall sections 720 and 722. It will be appreciated that flexible wall sections 720, 722 and 724 can have any suitable longitudinal length, and that such lengths will vary from application-to-application according to the intended use of the assembly and the nominal height, which may also be referred to in the art as the design height, at which the gas spring assembly will typically be used, such as is represented in FIG. 6 by height HT1, for example.

Additionally, flexible wall sections 720 and 722 can have an approximately common wall thickness, which is represented in FIG. 6 by reference dimension TH1, and approximately the same flexural stiffness and/or other properties and characteristics. Flexible wall section 724 is shown in FIG. 6 as having an increased wall thickness in comparison to the wall thickness of flexible wall sections 720 and 722, as is represented in FIG. 6 by reference dimension TH2. In a preferred arrangement, such an increased wall thickness will generate a corresponding increase in the flexural stiffness and/or other properties and characteristics of flexible wall section 724 in comparison with flexible wall sections 720 and 722, which would be comparatively more flexible. It will be appreciated, however, that such increased flexural stiffness and/or other properties and characteristics can be achieved in any other suitable manner or combination of manners, such as by utilizing one or more different materials having different flexural properties and/or characteristics, for example, such as has been described above.

Where the increased flexural stiffness and/or other properties and characteristics are achieved, at least in part, due to an increased wall thickness along flexible wall section 724, it will be appreciated that the increased wall thickness can be constructed in any suitable manner. As one example, one or more layers of material can be included along flexible wall section 724 to build up the wall thickness along the flexible wall section, such as is represented in FIG. 6 by areas 726. It will be appreciated that such one or more layers of material can be applied on or along outer surface 708, inner surface 710 or along both the outer surface and the inner surface.

End member assembly EM2 can be of any suitable type, kind, construction and/or configuration, and can be operatively connected or otherwise secured to the flexible spring member in any suitable manner. In the exemplary arrangement shown in FIGS. 6 and 6A, for example, end member assembly EM2 can include an end member body 800 and a support column 500 that are operatively engaged within one another. End member assembly EM2 can be broadly characterized as being of a type and kind that is commonly referred to as a piston (or a roll-off piston) and that has an outer surface 802 that abuttingly engages outer surface 708 of flexible spring member 700 such that a rolling lobe 728 is formed therealong. As assembly AS2 is displaced between extended and collapsed conditions, rolling lobe 728 is displaced along outer surface 802 in a conventional manner.

For purposes of brevity and ease of reading, a detailed description of support column 500 is not repeated here. However, it is to be distinctly understood that the foregoing description of support column 500 as well as the operation and interconnection thereof as a component of assembly AS1 (including interconnection with end member body 400 thereof) is equally applicable to use as a component of assembly AS2 (including interconnection with end member body 800 thereof).

End member body 800 can extend longitudinally between an end 804 and an end 806 opposite end 804. End member body 800 can include a longitudinally-extending outer side wall 808 that extends peripherally about axis AX and at least partially defines outer surface 802. End member body 800 can also include an inner side wall 810 that extends peripherally about axis AX and at least partially defines a passage 812 extending longitudinally through the end member body. Additionally, end member body 800 can include an end wall 814 disposed along end 804 and an end wall 816 disposed along end 806 with end walls 814 and 816 extending generally transverse to axis AX. In a preferred arrangement, end walls 814 and 816 can extend between and operatively interconnect outer side wall 808 and inner side wall 810 such that outer side wall 808, inner side wall 810 and end walls 814 and 816 at least partially define an end member chamber 818. In a preferred construction, end member chamber 818 can extend peripherally about and substantially surround passage 812.

In some cases, the end member chamber can be in fluid communication with spring chamber 712 and/or an external atmosphere EXT. It will be appreciated that such fluid communication can be achieved in any suitable manner. For example, the end member body can include one or more passages extending through one or more of the walls thereof (e.g., one or more of outer side wall 808, inner side wall 810, end wall 814 and/or end wall 816). In the arrangement shown in FIGS. 6 and 6A, end member body 800 includes passages 820 that extend through end wall 814 such that end member chamber 818 is disposed in fluid communication with spring chamber 712. In this manner, pressurized gas can be transferred into, out of and/or otherwise between end member chamber 818 and spring chamber 712.

As indicated above, it will be appreciated that end member body 800 can be formed from any suitable combination of one or more walls that can include any suitable number of one or more wall portions. As one example, in the arrangement shown in FIGS. 6 and 6A, outer side wall 808 can have a cross-sectional profile or shape that includes a plurality of wall portions, such as wall portions 822, 824, 826 and 828, for example. Wall portion 822 of outer side wall 808 is shown as being approximately linear and disposed in approximate alignment with axis AX such that outer side wall 808 has an approximately cylindrical shape along wall portion 822. Wall portion 824 is shown as extending between wall portion 822 and end wall 816, and can have a curved or curvilinear shape. As a result, end wall 816, which extends transverse to axis AX, can have a cross-sectional dimension, which is represented in FIG. 6 by reference dimension CD1, across an outer peripheral extent that is less than a cross-sectional dimension of wall portion 822, which is represented in FIG. 6 by reference dimension CD2. In this manner, end member body 800 can have a rounded overall shape along wall portion 824 of outer side wall 808.

Additionally, wall portion 826 of outer side wall 808 is shown as being approximately linear and disposed in approximate alignment with axis AX such that outer side wall 808 has an approximately cylindrical shape along wall portion 826. However, wall portion 826 is disposed radially outward of wall portion 822 such that wall portion 826 has a greater cross-section dimension, which is represented in FIG. 6 by reference dimension CD8, than cross-sectional dimension CD2 of wall portion 822. Wall portion 828 extends between and operatively interconnects wall portions 822 and 826. It will be appreciated that can be of any suitable profile or shape, such as linear, curved, tapered and/or frustoconical, for example, and preferably forms a relatively smooth transition between wall portions 822 and 828 such that rolling lobe 728 can be displaced along outer surface 802, which is at least partially defined by wall portions 822, 826 and 828. In some cases, wall portion 826 can terminate at a distal edge 830 opposite wall portion 828. Additionally, in some cases, distal edge 830 can be disposed in approximate alignment with at least a portion of end wall 816.

It will be appreciated that the axial position of at least wall portions 826 and 828 along outer side wall 808 can vary from application-to-application according to the intended use of the gas spring assembly and the nominal height, which may also be referred to in the art as the design height, at which the gas spring assembly will typically be used, such as is represented in FIG. 6 by height HT1, for example. Additionally, it will be appreciated that, in a preferred arrangement, flexible wall section 724 of flexible wall 702 can be disposed adjacent to wall portion 828 at the nominal height of gas spring assembly. Under such conditions, increased damping performance may be provided as a result of the increase in spring rate corresponding to the increased stiffness of flexible wall section 724 of flexible wall 702 and/or the increased cross-sectional dimension CD8 of wall portions 826 and/or 828 of outer side wall 808, which increased stiffness of flexible wall section 724 and increased cross-sectional dimension CD8 can be provided and/or used individually or in combination with one another.

Additionally, inner side wall 810 can have a cross-sectional profile or shape that includes a plurality of wall portions, such as wall portions 832, 834 and 836, for example. Wall portions 832 and 834 are shown as being approximately linear and disposed in approximate alignment with axis AX such that inner side wall 810 has an approximately cylindrical shape along wall portions 832 and 834. However, a cross-sectional dimension of wall portion 834 is shown as being greater than a corresponding cross-sectional dimension of wall portion 832, as is represented in FIG. 6A by reference dimensions CD4 and CD5, respectively. Wall portion 836 is shown as extending between and operatively interconnecting wall portions 832 and 834, and can be of any suitable profile or shape, such as linear, curved, tapered and/or frustoconical, for example.

End wall 814 can extend transverse to axis AX and can have a cross-sectional profile or shape that includes a plurality of wall portions, such as wall portions 838, 840 and 842, for example. Wall portion 838 is disposed radially outward from wall portion 840 and transitions into outer side wall 808 at a shoulder 844. Wall portion 840 is disposed radially inward from wall portion 838 and extends in axially-offset alignment relative to wall portion 838, as is represented in FIG. 6A by reference dimension OF1, such that a recess or cavity 846 extends into end member body 800 from along end wall 814. Wall portion 842 extends between and operatively interconnects wall portions 838 and 840, and can have any suitable profile or shape, such as linear, curved, tapered and/or frustoconical, for example.

End wall 816 can extend transverse to axis AX and can have a cross-sectional shape that includes a plurality of wall portions, such as wall portions 848 and 850, for example. Wall portion 848 is disposed radially outward from wall portion 850 and can have an approximately linear shape such that a substantially planar bottom surface 852 of end member body 800 can be formed thereby. Wall portion 850 extends in axially-offset alignment from wall portion 848, as is represented in FIG. 6A by reference dimension OF2. In this manner, wall portion 850 can at least partially define a pocket or recess 854 extending into end member body 800 from along end wall 816.

As indicated above, flexible spring member 700 can be secured on or along end member body 800 in any suitable manner. One example of a connection between the flexible spring member and the end member assembly is shown in FIG. 6 in which end member body 800 includes a connector wall 856 that can extend longitudinally outward from along end wall 812 in a direction away from end 806. End 706 of flexible spring member 700 can be received along an outer surface 858 of connector wall 856 such that a substantially fluid-tight seal is formed therebetween. It is to be understood, however, that the arrangement shown and described is merely exemplary and that any other suitable construction and/or configuration can alternately be used.

In some cases, end member body 800 can include one or more support walls that extend between and operatively interconnect one of more of outer side wall 808, inner side wall 810, end walls 814 and 816 and/or any wall portions or segments thereof. For example, a plurality of support walls 860 can extend between and operatively interconnect outer side wall 808, inner side wall 810 and end wall 814. In a preferred arrangement, support walls 860 can be disposed about axis AX such that the support walls are arranged in spaced-apart relation to one another. Additionally, or in the alternative, a plurality of support walls 862 can extend between and operatively interconnect outer side wall 808, inner side wall 810 and end wall 816. Again, in a preferred arrangement, support walls 862 can be disposed around axis AX such that the support walls are arranged in spaced-apart relation to one another.

As indicated above, end member body 800 can be of any suitable configuration and/or construction, and can be assembled from any suitable combination of components. As one example, end member body 800 is shown in FIGS. 4 and 5 as including body sections 864 and 866 that can be secured to one another in a manner suitable for forming end member body 800. Body section 864 can include end wall 814 as well as a segment 808A of outer side wall 808 and a segment 810A of inner side wall 810. In some cases, body section 864 can include one or more of support walls 860, if provided. Body section 866 can include end wall 816 as well as a segment 808B of outer side wall 808 and a segment 810B of inner side wall 810. In some cases, body section 866 can also include one or more of support walls 862, if provided.

Body sections 864 and 866 can be operatively secured to one another by way of any suitable connection, joint or combination thereof. For example, segment 808A is shown as terminating at a segment edge 868 and segment 808B is shown as terminating at a segment edge 870. Segment edges 868 and 870 can be disposed in abutting engagement with one another and a flowed-material joint 872 can extend between segments 808A and 808B along segment edges 868 and 870 such that a substantially fluid-tight connection can be formed between body sections 864 and 866. Additionally, or in the alternative, segment 810A is shown as terminating at a segment edge 874 and segment 810B is shown as terminating at a segment edge 876. Segment edges 874 and 876 can be disposed in abutting engagement with one another and a flowed-material joint 878 can extend between segments 810A and 810B along segment edges 874 and 876 such that a substantially fluid-tight connection can be formed between body sections 864 and 866.

Additionally, it will be appreciated that the one or more walls and/or one or more wall portions of end member body 800 can be of any suitable size, shape, configuration and/or arrangement, and can be formed from any suitable material or combination of materials, such as metal materials (e.g., steel or aluminum) and/or polymeric materials. Non-limiting examples of polymeric materials can include fiber-reinforced polypropylene, fiber-reinforced polyamide, unreinforced (i.e., relatively high-strength) polyester, polyethylene, polyamide, polyether or any combination thereof Gas spring assembly AS2 can also include a retainer assembly 600 dimensioned for securement on or along end member assembly EM2. In some cases, retainer assembly 600 can be secured on or along one or more of end member body 800 and support column 500, and can aid in retaining end member assembly EM2 in an assembled condition. Additionally, it will be appreciated that the retainer assembly can include any number of one or more components, which can be used in any suitable combination, configuration and/or arrangement. For purposes of brevity and ease of reading, a detailed description of retainer assembly 600 is not repeated here. However, it is to be distinctly understood that the foregoing description of retainer assembly 600 as well as the operation and interconnection thereof as components of gas spring assembly AS1 (including interconnection with end member assembly EM1 thereof) is equally applicable to use as component of gas spring assembly AS2 (including interconnection with end member assembly EM2 thereof).

Still another example of an assembly AS3 in accordance with the subject matter of the present disclosure, such as may be suitable for use as assemblies 102 in FIG. 1, for example, is shown in FIGS. 7-11. Assembly AS3 can have a longitudinal axis AX and can include flexible spring member 200 as well as an end member 900 and end member assembly EM1, which includes end member body 400 and support column 500, that are operatively connected to the flexible spring member. For purposes of brevity and ease of reading, detailed descriptions of flexible spring member 200 and end member assembly EM1 are not repeated here. However, it is to be distinctly understood that the foregoing description of flexible spring member 200 and end member assembly EM1 as well as the operation and interconnection thereof as components of assembly AS1 and/or AS2 are equally applicable to use as a components of assembly AS3.

It will be appreciated that the end member of a gas spring assembly in accordance with the subject matter of the present disclosure can be of any suitable type, kind, construction and/or configuration, and can be operatively connected or otherwise secured to the flexible spring member in any suitable manner. In the exemplary arrangement shown in FIGS. 7-9, for example, end member 900 is of a type commonly referred to as a bead plate and includes an end member wall 902 with a central wall portion 904 and an outer peripheral wall portion 906. End member 900 is disposed along end 204 of flexible wall 202 with outer peripheral wall portion 906 crimped or otherwise deformed around at least a portion of mounting bead 214 such that a substantially fluid-tight seal can be formed between flexible spring member 200 and end member 900.

Assembly AS3 can be disposed between associated sprung and unsprung masses of an associated vehicle in any suitable manner. For example, one end member can be operatively connected to the associated sprung mass with the other end member disposed toward and operatively connected to the associated unsprung mass. End member 900 can be secured along a first or upper structural component USC (FIG. 2), such as associated vehicle body BDY in FIG. 1, for example, and can be secured thereon in any suitable manner. For example, one or more securement devices, such as mounting studs 908, for example, can be included along end member 900. In some cases, mounting studs 908 can include a section 910 dimensioned for attachment to end member 902 in a suitable manner, such as, for example, by way of a flowed-material joint (not shown) or a press-fit connection (not identified).

Additionally, mounting studs 908 can include a section 912 that extends axially from along section 910 and can include one or more helical threads 914. Section 912 can be dimensioned to extend through mounting holes HLS (FIG. 2) in upper structural component USC (FIG. 2) and can receive one or more threaded nuts (e.g., threaded nuts 310 in FIG. 2) or other securement devices, for example. Mounting studs 908 can also include a section 916 that extends axially from along section 910 in a direction opposite section 912. As such, section 914 can extend into spring chamber 212 and can include one or more helical threads (not numbered) dimensioned to receive one or more threaded nuts or other securement devices, such as, for example, may be used to secure one or more devices and/or components of the gas spring assembly along an inside surface of the end member.

Furthermore, one or more fluid communication ports or transfer passages can optionally be provided to permit fluid communication with the spring chamber, such as may be used for transferring pressurized gas into and/or out of the spring chamber, for example. In the exemplary embodiment shown, a transfer passage 918 can extend through one or more of mounting studs 908 and can be in fluid communication with spring chamber 212. It will be appreciated, however, that any other suitable fluid communication arrangement could alternately be used.

Assembly AS3 can also include a restraining assembly 1000 that is connected between the end member and the end member assembly and is operative to provide resistance to the extension of gas spring assembly AS3 as the gas spring assembly is extended beyond a predetermined height. In some cases, the restraining assembly can take the form of a travel-limiting device that provides minimal resistance to extension but inhibits extension of the gas spring assembly beyond the predetermined extended height. In other cases, the restraining assembly can include one or more spring elements that gradually increase resistance to extension of the gas spring assembly as the gas spring assembly is extended beyond a predetermined height. In still other cases, a combination of such features and/or devices could be used.

As one example of a suitable construction, restraining assembly 1000 can include one or more restraining bands 1002 that are at least partially formed from an elastomeric material. The one or more restraining bands can be operatively connected between end member 900 and end member assembly EM1 in any suitable manner such that the one or more restraining bands can elongate and/or stretch as gas spring assembly AS3 is extended and can shorten and/or recover as the gas spring assembly returns toward a nominal or compressed height from the extended condition. It will be appreciated that the one or more restraining bands can be operatively connected between the end member and the end member assembly in any suitable manner and through the use of any suitable components, devices or combination thereof.

One example of a suitable construction is shown in FIGS. 7-11 in which restraining assembly 1000 includes a mounting assembly 1004 secured on or along end member 900 and a mounting assembly 1006 secured on or along end member assembly EM1. Additionally, restraining assembly 1000 can include two or more restraining bands 1002. In some cases, two or more restraining bands having different spring rates, elongations and/or other elastomeric properties could be used. In other cases, however, the two or more restraining bands can have substantially identical spring rates, elongations and/or other elastomeric properties could be used.

Restraining bands 1002 can be of any suitable type, kind, configuration and/or construction, and can be formed from any suitable material or combination of materials. As one example, restraining bands 1002 can take the form of endless bands that include an inside and outside surfaces 1008 and 1010 that extend peripherally about the interior and exterior of restraining bands 1002. The restraining bands can have a band thickness (not identified) extending between inside and outside surfaces 1008 and 1010. Additionally, restraining bands 1002 can have opposing edges 1012 that are spaced apart from one another and at least partially define a band width (not identified).

As indicated above, restraining bands 1002 can be formed from any suitable material or combination of materials, and can be constructed from any such material or combination of materials in any suitable manner. For example, the restraining bands can include one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

As one example of a suitable construction, restraining bands 1002 can include an inner or liner ply 1014 that at least partially forms inside surface 1008 and an outer or cover ply 1016 that at least partially forms outside surface 1010. In some cases, restraining bands 1002 can further include one or more reinforcing plies 1018 and 1020 that are disposed between inside and outside surfaces 1008 and 1010. It will be appreciated that the one or more reinforcing plies, if included, can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an approximately equal but opposite bias angle.

As discussed above, the one or more restraining bands can be secured on or along the end member or end member assembly of the gas spring assembly in any suitable manner. Mounting assembly 1004 is one example of a suitable construction and includes a mounting block 1022 dimensioned to receive and abuttingly engage restraining bands 1002. Mounting block 1022 can be of any suitable type, kind and/or construction, and can include any suitable number of one or more walls having any number of one or more wall portions that are formed from any suitable material or combination of materials, such as one or more polymeric materials (e.g., fiber-reinforced polypropylene, fiber-reinforced polyamide, unreinforced (i.e., relatively high-strength) polyester, polyethylene, polyamide and/or polyether).

Mounting block 1022 can include a central wall 1024 and two outer walls 1026 that are disposed along opposing sides of central wall 1024. Outer walls 1026 are spaced apart from central wall 1024 such that channels 1028 are formed between the central wall and the outer walls. Mounting block 1022 can also include opposing end surfaces 1030 and 1032 with channels 1028 extending into the mounting block from along end surface 1030. Channels 1028 can include a bottom wall or surface 1034 that can be curved or otherwise contoured to provide a smooth and distributed contact with restraining bands 1002.

Mounting block 1022 can be secured on or along the end member in any suitable manner. As one example, mounting assembly 1004 can include a mounting bracket 1036 that can capture and retained mounting block 1022 on or along end member 900. Mounting bracket 1036 can be of any suitable type, kind and/or construction, and can include any suitable number of one or more walls having any number of one or more wall portions that are formed from any suitable material or combination of materials, such as one or more metal materials (e.g., steel and aluminum). In the arrangement shown in FIGS. 7-11, mounting bracket 1036 includes a bracket wall 1038 having a central wall portion 1040 and two side wall portions 1042 that are disposed along opposing sides of the central wall portion. Side wall portions 1042 are spaced apart from one another such that a channel 1044 is at least partially formed by the central wall portion and the side wall portions. In a preferred arrangement, channel 1044 is dimensioned to at least partially receive mounting block 1022 such that the mounting block can be captured and retained on or along the end member.

Mounting bracket 1036 can be secured on or along end member 900 in any suitable manner. As one example, bracket wall 1038 of mounting bracket 1036 can include base wall portions 1046 that extend outwardly from along side wall portions 1042. A mounting hole 1048 can extend through base wall portions 1046 and can be dimensioned to at least partially receive sections 916 of mounting studs 908. In this manner, mounting bracket 1036 can be supported on or along end member 900 and secured thereto by way of one or more securement devices, such as threaded nuts 1049, for example. It will be appreciated, however, that other configurations and/or arrangements could alternately be used.

Mounting assembly 1006 is another example of a suitable construction for securing the one or more restraining bands on or along the end member or end member assembly of the gas spring assembly. Mounting assembly 1006 can include a mounting block 1050 that can include a central wall 1052 and two outer walls 1054 that are disposed along opposing sides of central wall 1052. Outer walls 1054 are spaced apart from one another such that at least one channel 1056 is formed along the central wall between the outer walls. Mounting block 1050 can include opposing end surfaces 1058 and 1060 with channel 1056 extending into the mounting block from along end surface 1060. Central wall 1052 can at least partially formed a bottom surface 1062 of channel 1056. In a preferred arrangement, central wall 1052 and/or bottom surface 1062 can be curved or otherwise contoured to provide a smooth and distributed contact with restraining bands 1002.

Mounting block 1050 can be secured on or along the end member assembly in any suitable manner, and using any combination of one or more devices and/or components. As one example, mounting assembly 1006 can include a securement device 1064 suitable for attaching mounting block 1050 on or along end member assembly EM1. In some cases, securement device 1064 can include head 1066 and a threaded shaft 1068 that include one or more helical threads (not identified) that can be cooperative with corresponding threads of one or more other components, such as threads 528 of column wall 508, for example. Mounting block 1050 can include a hole or passage 1070 extending therethrough that is dimensioned to at least partially receive securement device 1064.

In some case, mounting assembly 1006 can also, optionally, include a jounce bumper 1072 that be supported within spring chamber 212, such as to inhibit direct contact between end member 900 and end member assembly EM1, for example. It will be appreciated that the jounce bumper, if included, can be supported on or along the end member or end member assembly in any suitable manner. As one example, jounce bumper 1072 can be secured on or along mounting block 1050, and can be secured or otherwise attached thereto in any suitable manner. For example, jounce bumper 1072 can include a bumper body 1074 and a plurality of retaining clips or fingers 1076 that extend from along the bumper body and are dimensioned to abuttingly engage one or more corresponding features of mounting block 1050. In this manner, axially-applied loads and/or forces imparted on jounce bumper 1072 by end member 300 can be transmitted through support column 500 to the associated structural component (e.g., lower structural component LSC). In such cases, a minimal or otherwise substantially reduced percentage of the magnitude of the loads and/or forces will be transmitted through end member body 400.

Figure 12:
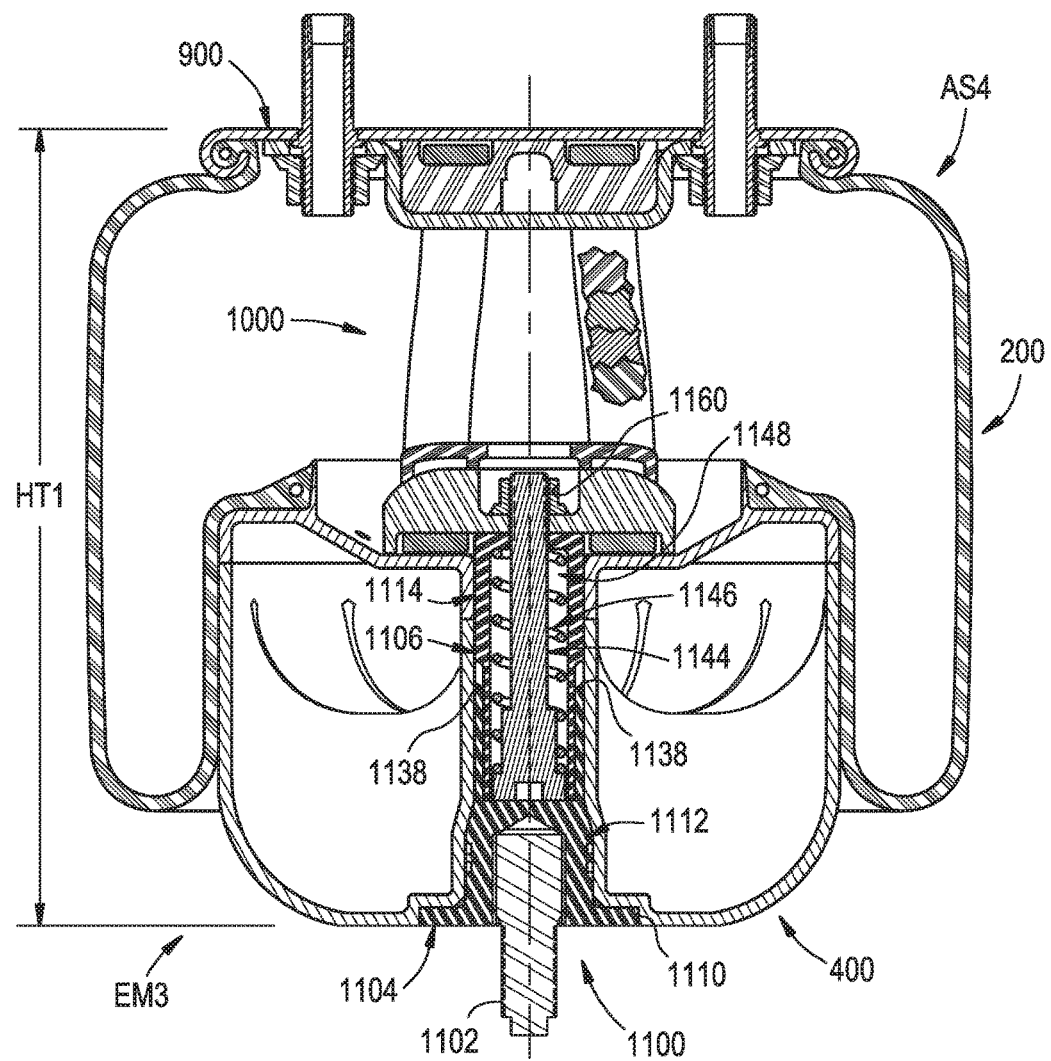
FIG. 12 is a cross-sectional side view of a further example of a gas spring assembly including an end member assembly and a restraint assembly in accordance with the subject matter of the present disclosure.
Figure 13:
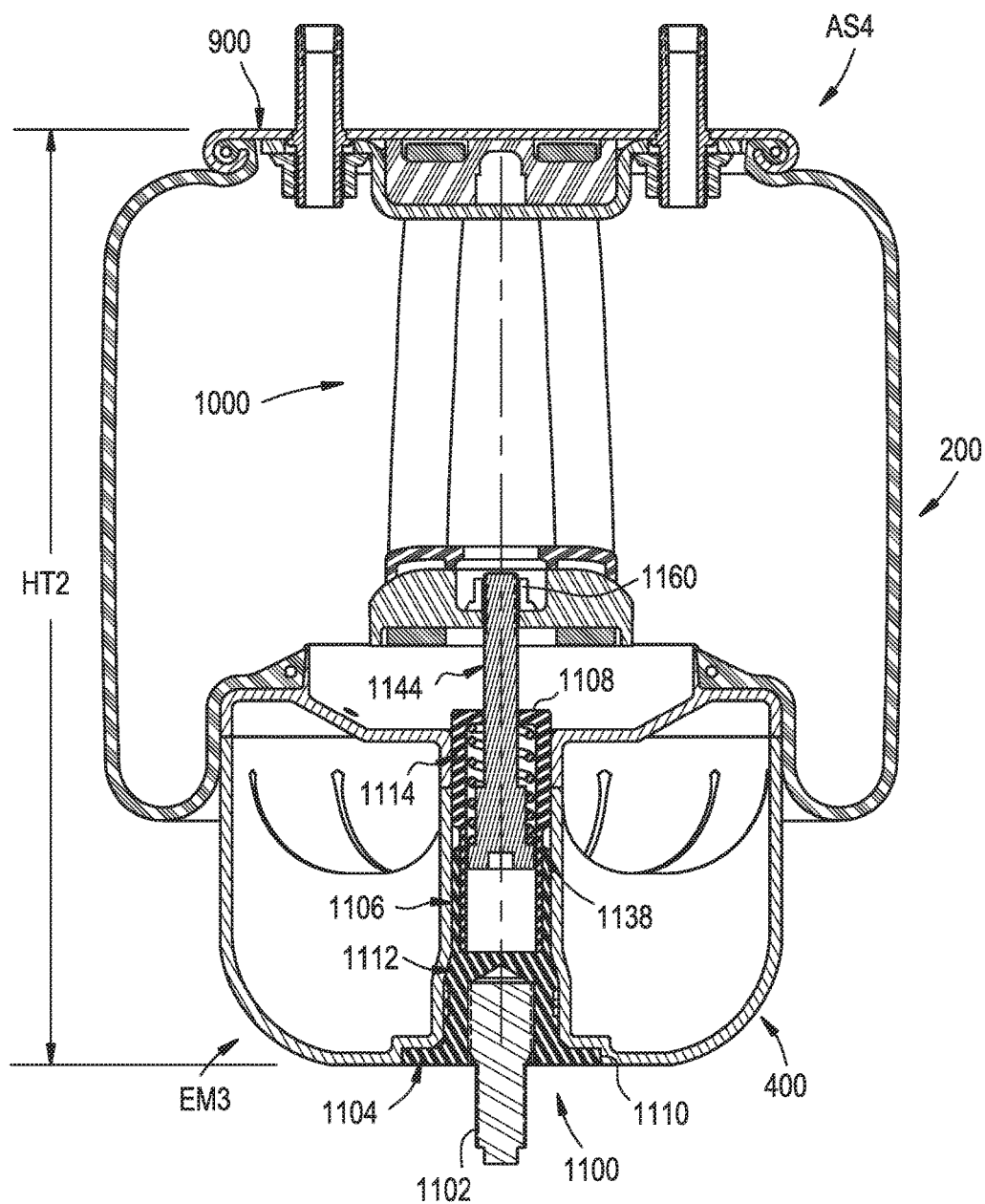
FIG. 13 is a cross-sectional view of the gas spring assembly in FIG. 12 shown in an extended condition.
Figure 14:
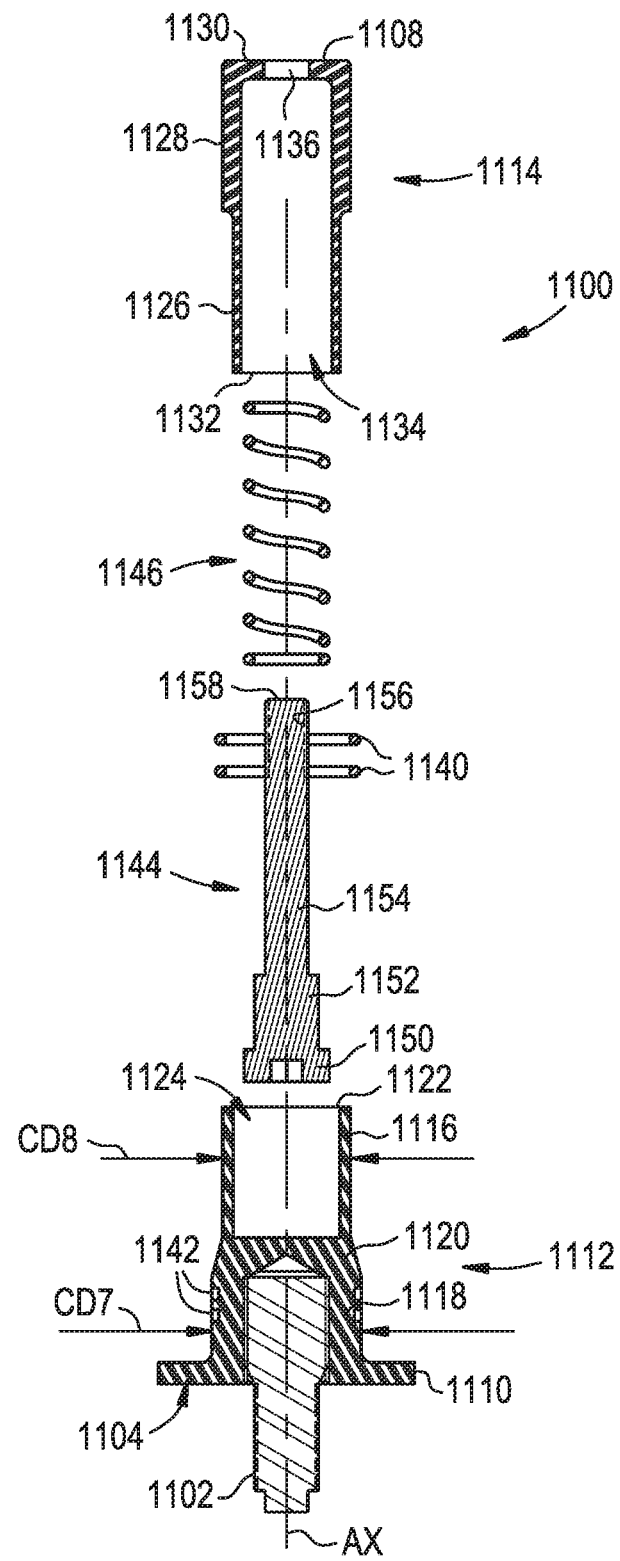
FIG. 14 is an exploded, cross-sectional side view of the exemplary end member assembly shown in FIGS. 12 and 13.

Yet another example of a assembly AS4 in accordance with the subject matter of the present disclosure, such as may be suitable for use as assemblies 102 in FIG. 1, for example, is shown in FIGS. 12-14. Assembly AS4 can have a longitudinal axis AX and can include flexible spring member 200 as well as end member 900 and an end member assembly EM3 that are operatively connected to the flexible spring member. For purposes of brevity and ease of reading, detailed descriptions of flexible spring member 200 and end member 900 are not repeated here. However, it is to be distinctly understood that the foregoing description of flexible spring member 200 and end member 900 as well as the operation and interconnection thereof as components of gas spring assembly AS1, AS2 and/or AS3 are equally applicable to use as a components of gas spring assembly AS3.

End member assembly EM3 can be of any suitable type, kind, construction and/or configuration, and can be operatively connected or otherwise secured to the flexible spring member in any suitable manner. In the exemplary arrangement shown in FIGS. 12-14, for example, end member assembly EM3 can include an end member body 400 and a support column 1100 that are operatively engaged within one another. End member assembly EM3 can be broadly characterized as being of a type and kind that is commonly referred to as a piston (or a roll-off piston) and that has an outer surface 402 that abuttingly engages outer surface 208 of flexible spring member 200 such that a rolling lobe 228 is formed therealong. As assembly AS4 is displaced between extended and collapsed conditions, rolling lobe 228 is displaced along outer surface 402 in a conventional manner.

For purposes of brevity and ease of reading, a detailed description of end member body 400 is not repeated here. However, it is to be distinctly understood that the foregoing description of end member body 400 as well as the operation and interconnection thereof as a component of gas spring assembly AS1, AS2 and/or AS3 is equally applicable to use as a component of gas spring assembly AS4.

It will be appreciated that end member assembly EM3 can be secured on or along a second or lower structural component LSC (FIG. 2), such as an axle AXL in FIG. 1, for example, in any suitable manner. As one example, lower structural component LSC could include one or more mounting holes HLS extending therethrough. In such case, a mounting stud 1102 could extend from support column 1100 and could extend through one of mounting holes HLS to receive a corresponding threaded nut (e.g., threaded nut 504 in FIG. 2), for example. Additionally, end member body 400 can be received on or along support column 1100 and retained thereon in a suitable manner such that end member assembly EM3 can be secured to lower structural component LSC.

Support column 1100 can include one or more walls having any number of one or more wall portions that are dimensioned to operatively engage end member body 400 and at least partially secure the end member body on or along an associated structural component, such as lower structural component LSC, for example. It will be appreciated that the one or more walls and one or more wall portions of support column 1100 can be of any suitable size, shape, configuration and/or arrangement, and can be formed from any suitable material or combination of materials, such as metal materials (e.g., steel or aluminum) and/or polymeric materials. Non-limiting examples of polymeric materials can include fiber-reinforced polypropylene, fiber-reinforced polyamide, unreinforced (i.e., relatively high-strength) polyester, polyethylene, polyamide, polyether or any combination thereof.

In the arrangement shown in FIGS. 12-14, for example, support column 1100 can include a base wall 1104 disposed transverse to the longitudinal axis AX and a column wall 1106 that extends longitudinally from along base wall 1104 toward a distal end 1108. Base wall 1104 extends radially outward to an outer peripheral edge 1110 and can be dimensioned to be at least partially received within recess 448 formed along end wall 416 of end member body 400.

Column wall 1106 can include column wall sections 1112 and 1114 that can be secured to one another to at least partially form column wall 1106. The column wall section 1112 can have a cross-sectional profile or shape that includes a plurality of wall portions, such as wall portions 1116, 1118 and 1120, for example. Wall portion 1116 extends from a section edge 1122 toward base wall 1104, and wall portion 1118 extends from base wall 1104 in a direction toward section edge 1122. Additionally, column wall section 1112 includes a recess 1124 that is at least partially defined by wall portion 1116 and that extends into the column wall section from along section edge 1122.

Wall portions 1116 and 1118 are shown as being approximately linear and disposed in approximate alignment with axis AX such that column wall 1106 has an approximately cylindrical shape along wall portions 1116 and 1118. A cross-sectional dimension of wall portion 1118 is shown as being greater than a corresponding cross-sectional dimension of wall portion 1116, as is represented in FIG. 14 by reference dimensions CD7 and CD9, respectively. Wall portion 1120 is shown as extending between and operatively interconnecting wall portions 1116 and 1118, and can be of any suitable profile or shape, such as linear, curved, tapered and/or frustoconical, for example.

The column wall section 1114 can have a cross-sectional profile or shape that includes a plurality of wall portions, such as wall portions 1126, 1128 and 1130, for example. Wall portion 1126 extends from a section edge 1132 toward distal end 1108, and wall portion 1128 extends from distal end 1108 in a direction toward section edge 1132. Additionally, column wall section 1114 includes a recess 1134 that is at least partially defined by wall portions 1126 and 1128. Recess 1134 can extend into column wall section 1114 from along section edge 1132. Wall portion 1130 can be disposed along distal end 1108 and form a closed end of the column wall. In some cases, an opening 1136 can extend through wall portion 1130 and into communication with recess 1134.

Wall portions 1126 and 1128 are shown as being approximately linear and disposed in approximate alignment with axis AX such that column wall 1106 has an approximately cylindrical shape along wall portions 1126 and 1128. In a preferred arrangement, wall portion 1128 can have a cross-sectional dimension that is at least approximately equal to the cross-sectional dimension of wall portion 1116 such that a substantially uniform outer surface of column wall 1106 can be formed by wall portions 1116 and 1128 in an assembled condition of column wall sections 1112 and 1114. Wall portion 1126 can have a cross-sectional dimension that is less than a corresponding cross-sectional dimension of recess 1124 such that wall portion 1126 can be at least partially received within recess 1124 in an assembled condition of column wall sections 1112 and 1114. It will be appreciated that column wall sections 1112 and 1114 can be secured together in any suitable manner, such as by way of a flowed-material joint 1138, for example. As another example, the column wall sections could be removably interconnected with one another, such as by way of complementary helical threads (not shown).

In a preferred arrangement, column wall 1106 can have a size and shape that is cooperative with the size and shape of inner side wall 410 and passage 412. It will be appreciated that the configuration and arrangement of inner side wall 410 and end wall 416 of end member body 400 together with the configuration and arrangement of base wall 1104 and column wall 1106 of support column 1100 will prevent the support column from passing fully through passage 412. As such, positioning one or more walls and/or wall portions of support column 1100 in abutting engagement with one or more walls and/or wall portions of end member body 400 and retaining the end member body and support column in such a relationship can generate an end member assembly, such as end member assembly EM3, for example.

It may be desirable, in some cases, to provide a substantially fluid-tight connection or interface between end member body 400 and support column 1100. It will be appreciated that such a substantially fluid-tight interface can be provided in any suitable manner. As one example, one or more sealing elements 1140 can be sealingly disposed between inner side wall 410 and column wall 1106 such that a substantially fluid-tight seal can be formed therebetween. It will be appreciated that the one or more sealing elements can be secured in operative engagement between inner side wall 410 and column wall 1106 in any suitable manner. As one example, one or more annular grooves (not shown) can extend into one or more of wall portions 426, 428 and/or 430 of inner side wall 410, and can be dimensioned to receive at least a portion of at least one of the sealing elements. As an additional or alternate example, one or more annular grooves can extend into one or more of wall portions 1116, 1118 and 1120 of column wall 1106. In the arrangement shown in FIGS. 12-14, for example, annular grooves 1142 extends radially inward into column wall 1106 along wall portion 1118 and are dimensioned to receive one of sealing elements 1140. It will be appreciated, however, that other configurations and/or arrangements could alternately be used.

Support column 1100 can be adapted to receive and/or otherwise operatively engage one or more securement devices and/or features, such as may be suitable for securing the end member body on or along the support column and/or for securing the end member assembly on or along an associated structural component. It will be appreciated that such securement devices can be operatively connected on or along the support column in any suitable manner. As one example, one or more securement devices and/or features could be formed as integral parts of the support column. As another example, one or more securement devices and/or features could be embedded (e.g., molded) within the support column. As a further example, the support column can include one or more passages dimensioned to receive an associated securement device. In the arrangement shown in FIGS. 12-14, for example, column wall section 1112 can have an inside surface (not numbered) that at least partially defines a hole or opening (not numbered) extending into column wall section 1112 from along base wall 1104. One or more helical threads (not numbered) can be formed on or along the inside surface and mounting stud 1102 can threadably engage the helical threads such that the mounting stud is retained on or along the column wall. Alternately, a portion of mounting stud 1102 could be molded into or otherwise embedded within base wall 1104 and/or column wall 1106. As such, at least support column 1100 can be secured on or along an associated structural component, such as lower structural component LSC, for example, by securing mounting stud 1102 therealong.

Assembly AS4 can also include restraining assembly 1000 that is connected between the end member and the end member assembly and is operative to provide resistance to the extension of assembly AS4 as the assembly is extended beyond a predetermined height. In some cases, the restraining assembly can take the form of a travel-limiting device that provides minimal resistance to extension but inhibits extension of the gas spring assembly beyond the predetermined extended height. In other cases, the restraining assembly can include one or more spring elements that gradually increase resistance to extension of the gas spring assembly as the gas spring assembly is extended beyond a predetermined height. In still other cases, a combination of such features and/or devices could be used.

For purposes of brevity and ease of reading, a detailed description of restraining assembly 1000 is not repeated here. However, it is to be distinctly understood that the foregoing description of restraining assembly 1000 as well as the operation and interconnection thereof as a component of assembly AS3 is equally applicable to use as a component of assembly AS4.

Support column 1100 can also be adapted to permit axial displacement of mounting assembly 1006 of restraining assembly 1000, and can include any suitable components, devices and/or combination thereof to provide for such capability. As one example, support column 1100 can include a connector rod 1144 and a biasing element 1146 that are disposed at least partially within a chamber 1148 formed by a recesses 1124 and 1134 in an assembled condition of column wall sections 1112 and 1114. Connector rod 1144 can include a head section 1150, a shoulder section 1152 that extends axially from along head 1150, and a rod section 1154 that extends axially from along shoulder section 1152 in a direction opposite head section 1150. One or more helical threads 1156 can be formed along a distal end 1158 of connector rod 1144.

In an assembled condition of support column 1100, biasing element 1146 can be disposed between wall portion 1130 of column wall 1106 and head section 1150 of connector rod 1144. In a preferred arrangement, biasing element 1146 can urge connector rod 1144 in an axial direction away from distal end 1108 of column wall 1106. At least a portion of rod section 1154 can extend through opening 1136 and project into spring chamber 212. In such case, mounting block 1050 can be secured on or along distal end 1158 of connector rod 1144, such as by way of a securement device 1160 threadably engaging helical threads 1156 along rod section 1154, for example.

Assembly AS4 is shown in FIG. 12 as being at a nominal height, which may also be referred to in the art as the design height, at which the gas spring assembly will typically be used, such as is represented in FIG. 12 by height HT1, for example. During certain conditions of use, assembly AS4 can be displaced into an extended condition at which the height of the gas spring assembly exceeds a predetermined extended height. Under such conditions, restraining assembly 1000 can function to inhibit or at least reduce the magnitude of such displacement, such as has been described above. In some cases, however, the gas spring assembly may experience further extension, such as is represented in FIG. 13 by reference dimension HT2, for example. Under such conditions, support column 1100 can permit mounting block 1050 to extend in a direction away from end member assembly EM3, such as by compressing biasing element 1146 and permitting connector rod 1144 to extend out of chamber 1148 through opening 1136, such as is shown in FIG. 13, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, terms such as "gas," "pneumatic" and "fluid" as well as variants thereof, are used herein to broadly refer to and include any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein and whether or not initially presented in herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:
1. An assembly comprising:
a flexible spring member having a longitudinal axis and including a flexible wall extending peripherally about said axis and longitudinally between a first end and a second end opposite said first end;
an end member operatively connected to said flexible wall across said first end thereof such that a substantially fluid-tight seal is formed between said end member and said flexible spring member; and,
an end member assembly operatively connected to said flexible wall across said second end thereof such that a substantially fluid-tight seal is formed between said end member assembly and said flexible spring member, said end member assembly including:
an end member body extending longitudinally between opposing first and second body ends, said end member body including an end member wall that at least partially defines an end member chamber and a passage extending axially through said end member body between said first and second body ends with said end member chamber substantially surrounding said passage;

a support column extending longitudinally between opposing first and second column ends, said support column including a column wall with a first wall portion extending from along said first column end toward said second column end and a second wall portion extending radially outward beyond said first wall portion along said second column end, said support column received within said passage of said end member body such that said first column end is accessible from within said spring chamber and along said first body end of said end member body and such that said second wall portion along said second column end is disposed outwardly of said end member assembly;
a retainer assembly operatively attached to said first column end of said support column and operatively securing said end member body and said support column to one another; and,
an elongated gas damper passage extending in fluid communication between said spring chamber and said end member chamber, said elongated gas damper passage operative to dissipate kinetic energy acting on said assembly during displacement of said assembly between extended and compressed conditions;
wherein said support column includes a column passage extending axially therethrough and in fluid communication with said spring chamber and said end member chamber such that said elongated gas damper passage includes said column passage.

2. An assembly according to claim 1, wherein said end member body includes a recess formed along said passage adjacent said second end wall, and said support column includes a base wall extending transverse to said longitudinal axis and a column wall projecting axially from said base wall, said support column oriented such that said base wall is at least partially received within said recess along said second end wall of said end member body and said column wall projects into said passage of said end member body.

3. An assembly according to claim 1, further comprising a sealing element disposed between said end member body and said support column, said sealing element operative to at least partially form a substantially fluid-tight seal between said end member body and said support column.

4. An assembly according to claim 1, wherein said end member wall includes one or more openings extending therethrough in fluid communication with said end member chamber to at least partially form said elongated gas damper passage.

5. An assembly according to claim 1, wherein said end member assembly includes a chamber formed between said end member body and said support column, said chamber at least partially forming said elongated gas damper passage.

6. An assembly according to claim 1, wherein said end member wall of said end member body includes an outer side wall portion extending longitudinally between said first and second body ends and an inner side wall portion disposed radially inward from said outer side wall portion and extending longitudinally between said first and second ends, said outer side wall portion at least partially defining an outside surface of said end member body, and said inner side wall portion at least partially defining said passage extending through said end member body.

7. An assembly according to claim 6, wherein said end member wall includes a first end wall portion disposed between and operatively connecting said inner and outer side wall portions along said first body end and a second end wall portion disposed between and operatively connecting said inner and outer side wall portions along said second body end such that said end member chamber is at least partially defined by said outer side wall portion, said inner side wall portion and said first and second end wall portions.

8. An assembly according to claim 1, wherein said end member body includes a first body section that includes a first portion of said end member wall and a second body section that includes a second portion of said end member wall, said first and second body sections attached to one another by way of first and second flowed-material joints extending peripherally about said axis with said first flowed-material joint disposed radially inward from said second flowed-material joint.

9. An assembly according to claim 8, wherein said first flowed-material joint is disposed along said passage extending through said end member body and said second flowed-material joint is disposed along an outer peripheral surface of said end member body.

10. An assembly according to claim 1, further comprising a restraining assembly operatively connected between said end member and said end member assembly, said restraining assembly disposed within said spring chamber and operative to provide resistance to extension of said assembly beyond a predetermined height.

11. An assembly according to claim 10, wherein said restraining assembly includes at least one endless annular band operatively connected between said end member and said end member assembly.

12. A suspension system comprising:
a pressurized gas system including a pressurized gas source and a control device; and,
at least assembly according to claim 1, disposed in fluid communication with said pressurized gas source through said control device such that pressurized gas can be selectively transferred into and out of at least said spring chamber.

13. An assembly comprising:
a flexible spring member having a longitudinal axis and including a flexible wall extending peripherally about said axis and longitudinally between a first end and a second end opposite said first end;
an end member operatively connected to said flexible wall across said first end thereof such that a substantially fluid-tight seal is formed between said end member and said flexible spring member; and,
an end member assembly operatively connected to said flexible wall across said second end thereof such that a substantially fluid-tight seal is formed between said end member assembly and said flexible spring member, said end member assembly including:
an end member body extending longitudinally between opposing first and second body ends, said end member body including an end member wall that at least partially defines an end member chamber and a passage extending axially through said end member body between said first and second body ends with said end member chamber substantially surrounding said passage;
a support column extending longitudinally between opposing first and second column ends, said support column including a column wall with a first wall portion extending from along said first column end toward said second column end and a second wall portion extending radially outward beyond said first wall portion along said second column end, said support column received within said passage of said end member body such that said first column end is accessible from within said spring chamber and along said first body end of said end member body and such that said second wall portion along said second column end is disposed outwardly of said end member assembly; and, an elongated gas damper passage extending in fluid communication between said spring chamber and said end member chamber, said elongated gas damper passage operative to dissipate kinetic energy acting on said assembly during displacement of said assembly between extended and compressed conditions;

wherein said column wall includes one or more openings extending therethrough in fluid communication with said column passage to at least partially form said elongated gas damper passage.

14. An assembly according to claim 13, wherein said end member body includes a recess formed along said passage adjacent said second end wall, and said support column includes a base wall extending transverse to said longitudinal axis and a column wall projecting axially from said base wall, said support column oriented such that said base wall is at least partially received within said recess along said second end wall of said end member body and said column wall projects into said passage of said end member body.

15. An assembly according to claim 13, further comprising a sealing element disposed between said end member body and said support column, said sealing element operative to at least partially form a substantially fluid-tight seal between said end member body and said support column.

16. An assembly according to claim 13, wherein said end member wall of said end member body includes an outer side wall portion extending longitudinally between said first and second body ends and an inner side wall portion disposed radially inward from said outer side wall portion and extending longitudinally between said first and second ends, said outer side wall portion at least partially defining an outside surface of said end member body, and said inner side wall portion at least partially defining said passage extending through said end member body.

17. An assembly according to claim 16, wherein said end member wall includes a first end wall portion disposed between and operatively connecting said inner and outer side wall portions along said first body end and a second end wall portion disposed between and operatively connecting said inner and outer side wall portions along said second body end such that said end member chamber is at least partially defined by said outer side wall portion, said inner side wall portion and said first and second end wall portions.

18. An assembly according to claim 13, wherein said end member body includes a first body section that includes a first portion of said end member wall and a second body section that includes a second portion of said end member wall, said first and second body sections attached to one another by way of first and second flowed-material joints extending peripherally about said axis with said first flowed-material joint disposed radially inward from said second flowed-material joint.

19. An assembly according to claim 18, wherein said first flowed-material joint is disposed along said passage extending through said end member body and said second flowed-material joint is disposed along an outer peripheral surface of said end member body.

20. An end member assembly dimensioned for securement to an associated flexible spring member for forming an associated gas spring assembly having an associated spring chamber, said end member assembly comprising:

an end member body extending longitudinally between opposing first and second body ends, said end member body including an end member wall that at least partially defines an end member chamber and a passage extending axially through said end member body between said first and second body ends with said end member chamber substantially surrounding said passage, said end member wall of said end member body including an outer side wall portion extending longitudinally between said first and second body ends and an inner side wall portion disposed radially inward from said outer side wall portion and extending longitudinally between said first and second ends, said outer side wall portion at least partially defining an outside surface of said end member body, and said inner side wall portion having an inner side wall surface portion at least partially defining said passage extending through said end member body;

a support column extending longitudinally between opposing first and second column ends at least partially defining a longitudinal length therebetween, said support column including a column wall with a first wall portion extending from along said first column end toward said second column end and a second wall portion extending radially outward beyond said first wall portion along said second column end, said support column received within said passage of said end member body such that said first column end is accessible from within the associated spring chamber along said first body end of said end member body and such that said second wall portion along said second column end extends radially outward of said inner side wall portion of said end member body, said column wall engaged along a major portion of said longitudinal length thereof with said inner side wall surface portion of said end member body; and, a retainer assembly operatively attached to said first column end of said support column and operatively securing said end member body and said support column to one another.

* * * * *